(12) United States Patent  (10) Patent No.: US 9,195,303 B2
Norieda et al.  (45) Date of Patent: Nov. 24, 2015

(54) INPUT DEVICE, METHOD AND MEDIUM

(75) Inventors: Shin Norieda, Tokyo (JP); Hideo Mitsuhashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 166 days.

(21) Appl. No.: 13/635,096

(22) PCT Filed: Mar. 14, 2011

(86) PCT No.: PCT/JP2011/055940
§ 371 (c)(1),
(2), (4) Date: Sep. 14, 2012

(87) PCT Pub. No.: WO2011/115060
PCT Pub. Date: Sep. 22, 2011

(65) Prior Publication Data
US 2013/0002544 A1 Jan. 3, 2013

(30) Foreign Application Priority Data

Mar. 15, 2010 (JP) ................................. 2010-057940
Dec. 15, 2010 (JP) ................................. 2010-279665

(51) Int. Cl.
G09G 5/00 (2006.01)
G06F 3/01 (2006.01)
G04G 21/04 (2013.01)
G06F 3/0488 (2013.01)
G06F 3/042 (2006.01)
G06F 3/043 (2006.01)

(52) U.S. Cl.
CPC ................ *G06F 3/011* (2013.01); *G04G 21/04* (2013.01); *G06F 3/0426* (2013.01); *G06F 3/0433* (2013.01); *G06F 3/04886* (2013.01)

(58) Field of Classification Search
USPC ................. 345/156, 173, 158, 175, 176, 177; 600/302; 341/22
See application file for complete search history.

(56) References Cited

U.S. PATENT DOCUMENTS

2002/0009972 A1 1/2002 Amento et al.
2008/0278446 A1* 11/2008 Schifter ......................... 345/158
2009/0124872 A1* 5/2009 Uchiyama et al. ............ 600/302
(Continued)

FOREIGN PATENT DOCUMENTS

JP 10-051527 A 2/1998
JP 10-200610 A 7/1998
(Continued)

OTHER PUBLICATIONS

Tetsuo Nozawa, "Human skin to the touch panel, developed by Microsoft Carnegie Mellon University", Tech On!, Nikkei BP, Mar. 6, 2010, [online] <http://techon.nikkeibp.co.jp/article/NEWS/20100306/180875/>.
(Continued)

*Primary Examiner* — Thuy Pardo
(74) *Attorney, Agent, or Firm* — Sughrue Mion, PLLC

(57) ABSTRACT

An input device comprises: a detection unit that detects as detection data an oscillation generated by tapping a body of a user and transmitted via the body; and an input information identification unit that refers to the detection data, identifies a tap site based on a fact that the detection data varies depending on a physical property of a body tissue associated with the tap site, and outputs an operation command allocated to the identified tap site.

8 Claims, 18 Drawing Sheets

(56) References Cited

U.S. PATENT DOCUMENTS

2009/0146848 A1* 6/2009 Ghassabian .................. 341/22
2009/0256800 A1* 10/2009 Kaufman ..................... 345/156

FOREIGN PATENT DOCUMENTS

| | | |
|---|---|---|
| JP | 2002-358149 A | 12/2002 |
| JP | 2008-253310 A | 10/2008 |

OTHER PUBLICATIONS

Communication dated Jan. 6, 2015 from the Japanese Patent Office in counterpart application No. 2012-505673.

"Harrison's Touchscreen Revolution", CMU, Carnegie Mellon University, <URL: http: // www. cmu. edu / homepage / computing / 2010 / winter / skinput. shtml>, [online], 1 page total.

Communication dated Apr. 14, 2015 from the Japanese Patent Office in counterpart application No. 2012-505673.

* cited by examiner

ACCELERATION SENSOR 9

WIRING SUBSTRATE 10

FIG. 10
| INPUT AREAS AND FUNCTIONS | LOWER THRESHOLD VALUES | UPPER THRESHOLD VALUES |
|---|---|---|
| FIRST INPUT AREA<br><br>[SKIP FORWARD] 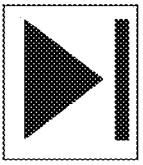 | 0.0325 | 0.0355 |
| SECOND INPUT AREA<br><br>[PLAY/PAUSE] 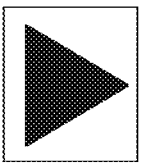 | 0.0580 | 0.0610 |
| THIRD INPUT AREA<br><br>[STOP] 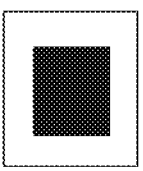 | 0.0400 | 0.0485 |

FIG. 18
| INPUT AREAS AND FUNCTIONS | LOWER THRESHOLD VALUES | UPPER THRESHOLD VALUES | ACCELERATION OF GRAVITY |
|---|---|---|---|
| FIRST INPUT AREA [FAST FORWARD]  | 0.0325 | 0.0355 | (−8.550,−1.010,−4.702) |
| SECOND INPUT AREA [PLAY/ PAUSE]  | 0.0580 | 0.00610 | (−8.550,−1.010,−4.702) |
| THIRD INPUT AREA [FAST REWIND]  | 0.0400 | 0.0485 | (−8.550,−1.010,−4.702) |
| FIRST INPUT AREA [SKIP FORWARD]  | 0.0325 | 0.0355 | (−2.710,−1.210,−9.350) |
| SECOND INPUT AREA [PLAY/PAUSE]  | 0.0580 | 0.00610 | (−2.710,−1.210,−9.350) |
| THIRD INPUT AREA [STOP]  | 0.0400 | 0.0485 | (−2.710,−1.210,−9.350) |
| ⋮ | | | |

INPUT DEVICE, METHOD AND MEDIUM

CROSS-REFERENCES TO RELATED APPLICATIONS

This application is a National Stage of International Application No. PCT/JP2011/055940 filed Mar. 14, 2011, claiming priority based on Japanese Patent Application Nos. 2010-057940, filed Mar. 15, 2010 and 2010-279665 filed Dec. 15, 2010, the contents of all of which are incorporated herein by reference in their entirety.

TECHNICAL FIELD

This invention relates to an input device, an input method and to a medium. More particularly, it relates to an input device, an input method and a medium that may be applied to mobile electronic equipment, such as mobile music players or mobile phones.

BACKGROUND

To perform input operations, such as sound volume adjustment or music air selection, on small-sized mobile electronic equipment, an operation is needed for a user to take out the equipment out of a pocket of his/her apparel or from a baggage enclosing it. In Patent Document 1, there is disclosed, as a technique which evades this operation, a mobile phone device in which part of the functions of the mobile phone is separately performed by a device fitted on a user's arm.

In Patent Document 2, there is disclosed a phone device which is attached to a user's ear to allow communication over the mobile phone to be performed based on a trigger signal produced when the user emits a chewing or biting sound.

In Patent Document 3, there is further disclosed an input device that is constructed like a wrist-watch and that inputs user's gestures such as 'grabbing', 'releasing', 'twisting' or 'shaking' as command inputs.

RELATED TECHNICAL DOCUMENTS

Patent Documents

[Patent Document 1] JP Patent Kokai Publication No. JP-A-10-051527
[Patent Document 2] JP Patent Kokai Publication No. JP-A-10-200610
[Patent Document 3] JP Patent Kokai Publication No. JP-P2002-358149A

SUMMARY

The entire disclosures of the above Patent Documents are incorporated herein by reference thereto. The following analysis is made by the present inventor.

In the mobile phone shown in Patent Document 1, an input key is arranged in the bracelet-shaped small-sized input device. Since the input key is small-sized, it is difficult to confirm an input operation or identify an input key, such that an input error such as incorrect push operation is likely to be produced.

In the phone device shown in Patent Document 2, just one sort of the on/off (ON/OFF) operation, herein the chewing or biting, is used for the input operation. Hence, it becomes difficult to realize the operation for a plurality of functions possessed by the equipment which is to be run in operation.

In the phone device shown in Patent Document 3, composite gestures, each combined from complex movements, are used as input operations. It is thus difficult to discriminate the input operations from our ordinary day-to-day movements, so that an input operation not intended by the user may be accepted by the input device as command input.

There is a need, upon an input operation for the mobile input device, to simplify the input operation by a user, as well as a need for a user to take out the input device for its actuation.

According to a first aspect of the present invention, there is provided an input device comprising:
a detection unit that detects as detection data an oscillation generated by tapping a body of a user and transmitted via the body; and
an input information identification unit that refers to the detection data and identifies a tap site based on a fact that the detection data varies depending on a physical property of a body tissue associated with the tap site.

According to a second aspect of the present invention, there is provided an input method comprising:
by a computer, detecting as detection data an oscillation generated by tapping a body of a user and transmitted via the body; and
referring to the detection data and identifying a tap site based on a fact that the detection data varies depending on a physical property of a body tissue associated with a site where the detection data is detected.

According to a third aspect of the present invention, there is provided a non-transitory computer-readable storage medium storing a program that causes a computer to execute:
detecting as detection data an oscillation generated by tapping a body of a user and transmitted via the body; and
referring to the detection data and identifying a tap site based on a fact that the detection data varies depending on a physical property of a body tissue associated with a site where the detection data is detected.

According to a fourth aspect of the present invention, there is provided an input device, comprising:
a detection unit that detects as detection data an oscillation generated by tapping a body of a user and transmitted via the body; and
an input information identification unit that refers to the detection data, identifies a tap site based on a fact that the detection data varies depending on a physical property of a body tissue associated with the tap site, and outputs an operation command allocated to the identified tap site.

According to a fifth aspect of the present invention, there is provided an input method, comprising:
by a computer, detecting as detection data a oscillation generated by tapping a body of a user and transmitted via the body;
referring to the detection data and identifying a tap site based on a fact that the detection data varies depending on a physical property of a body tissue associated with the tap site; and
outputting an operation command allocated to the identified tap site.

According to a sixth aspect of the present invention, there is provided a program that causes a computer to execute:
detecting as detection data an oscillation generated by tapping a body of a user and transmitted via the body;
referring to the detection data and identifying a tap site based on a fact that the detection data varies depending on a physical property of a body tissue associated with the tap site; and
outputting an operation command allocated to the identified tap site.

Meritorious Effect of the Invention

The present invention provides the following advantage, but not restricted thereto. In the input device, input method and the medium, according to the present invention, it is unnecessary for a user to take out the input device in performing input operations for mobile electronic equipment. In addition, the input operation by the user may be simpler.

BRIEF DESCRIPTION OF THE DRAWINGS

FIG. 10 is tabulated representation showing the relationship of correspondence between upper and lower threshold values and the input information identification data in the input device of the first exemplary embodiment.

FIG. 18 is tabulated representation showing the relationship of correspondence between combinations of the upper and lower threshold values and the direction of gravitational acceleration corresponding to the arm postures and the input information identification data of the input device of the third exemplary embodiment.

PREFERRED MODES

Figure 1:
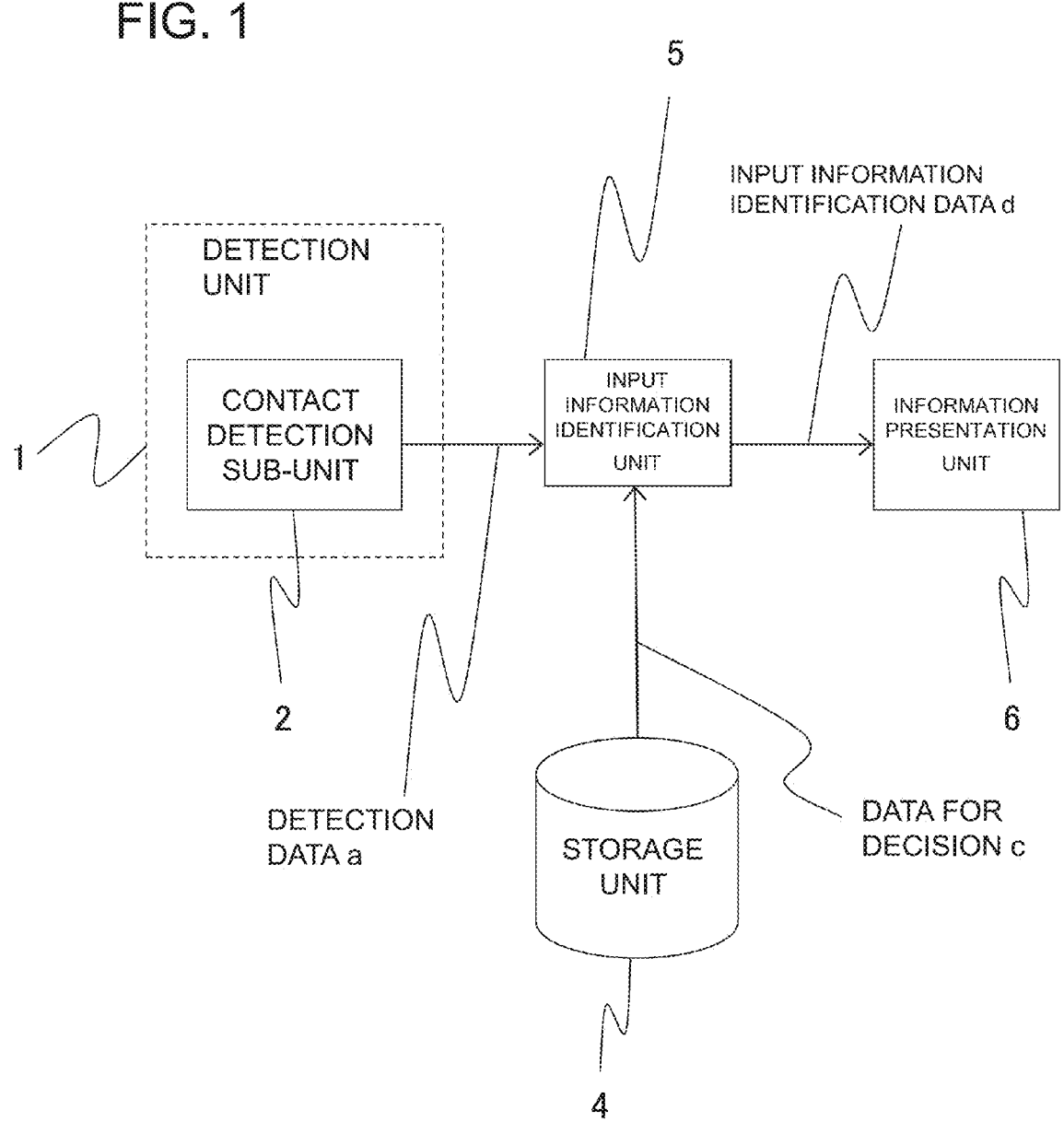
FIG. 1 is a block diagram showing a configuration of an input device according to a first exemplary embodiment.

In the present disclosure, there are various possible modes, which include the following, but not restricted thereto.

In a first mode, there is provided the input device according to the above mentioned first aspect.

In the input device in a second mode, the detection data may be a period of the oscillation.

In a third mode, the input device may further comprise a storage unit that stores a period of the oscillation detected by the detection unit and a tap site in association with each other, wherein the input information identification unit may refer to the storage unit to identify the tap site.

In the input device in a fourth mode, the storage unit may store upper and lower threshold values of a period of the oscillation and a tap site in association with each other, and the input information identification unit may identify the tap site by deciding whether or not the detected period of the oscillation falls between the upper and lower threshold values.

In the input device in a fifth mode, the detection data may be an attenuation characteristic of the oscillation.

In a sixth mode, there is provided the input device including another storage unit that retains the attenuation characteristic(s) of the oscillation(s) detected by the detection unit and tap site(s) in association with each other. The input information identification unit refers to the other storage unit to identify the tap site.

In the input device in a seventh mode, the storage unit may store upper and lower threshold values of an attenuation characteristic of the oscillation and a tap site in association with each other, and the input information identification unit may identify the tap site by deciding whether or not the detected attenuation characteristic of the oscillation falls between the upper and lower threshold values.

In the input device in an eighth mode, the attenuation characteristic may be a settling time or attenuation ratio of the oscillation.

In a ninth mode, there is provided the input method according to the above mentioned second aspect.

In a tenth mode, there is provided the program according to the above mentioned third aspect.

In an eleventh mode, there is provided a computer-readable recording medium having the above mentioned program recorded thereon.

In a twelfth mode, there is provided the input device according to the above mentioned fourth aspect.

In a thirteenth mode, there is provided the input method according to the above mentioned fifth aspect.

In the input device in a fourteenth mode, the detection unit may comprise an acceleration sensor and may be provided on a wrist of a hand on the tapped side, and the input information identification unit may identify a posture (or attitude) of a tapped arm in response to a gravitational acceleration detected by the acceleration sensor to output an operation command that is associated with a set of the identified tap site and posture of the tapped arm.

According to the present invention, tapping a part of a user's body may be allocated to an input operation. According to the present invention, the input device may be a bracelet-like small-sized device, and the operation of taking out the input device to actuate electronic equipment may be dispensed with. It is thus possible to eliminate complex input operations and to reduce time needed in performing input operations.

Moreover, since an input operation may be allocated to a part of the user's body, it is possible to provide a sufficiently large input area, thus possibly preventing occurrence of input errors on the part of the user.

Since a plurality of input areas may be provided, according to the present invention, it is possible to realize a plurality of different sorts of the input operations, that is, the input operations for a plurality of functions possessed by the electronic equipment being actuated.

In addition, according to the present invention, since the specified operation of a user touching his/her body is the input operation, it is possible to distinguish the input operation from routine ordinary bodily movements and hence to prevent input operation not inherently expected by the user.

First Exemplary Embodiment

An input device according to a first exemplary embodiment will now be described with reference to the drawings.

Figure 2:
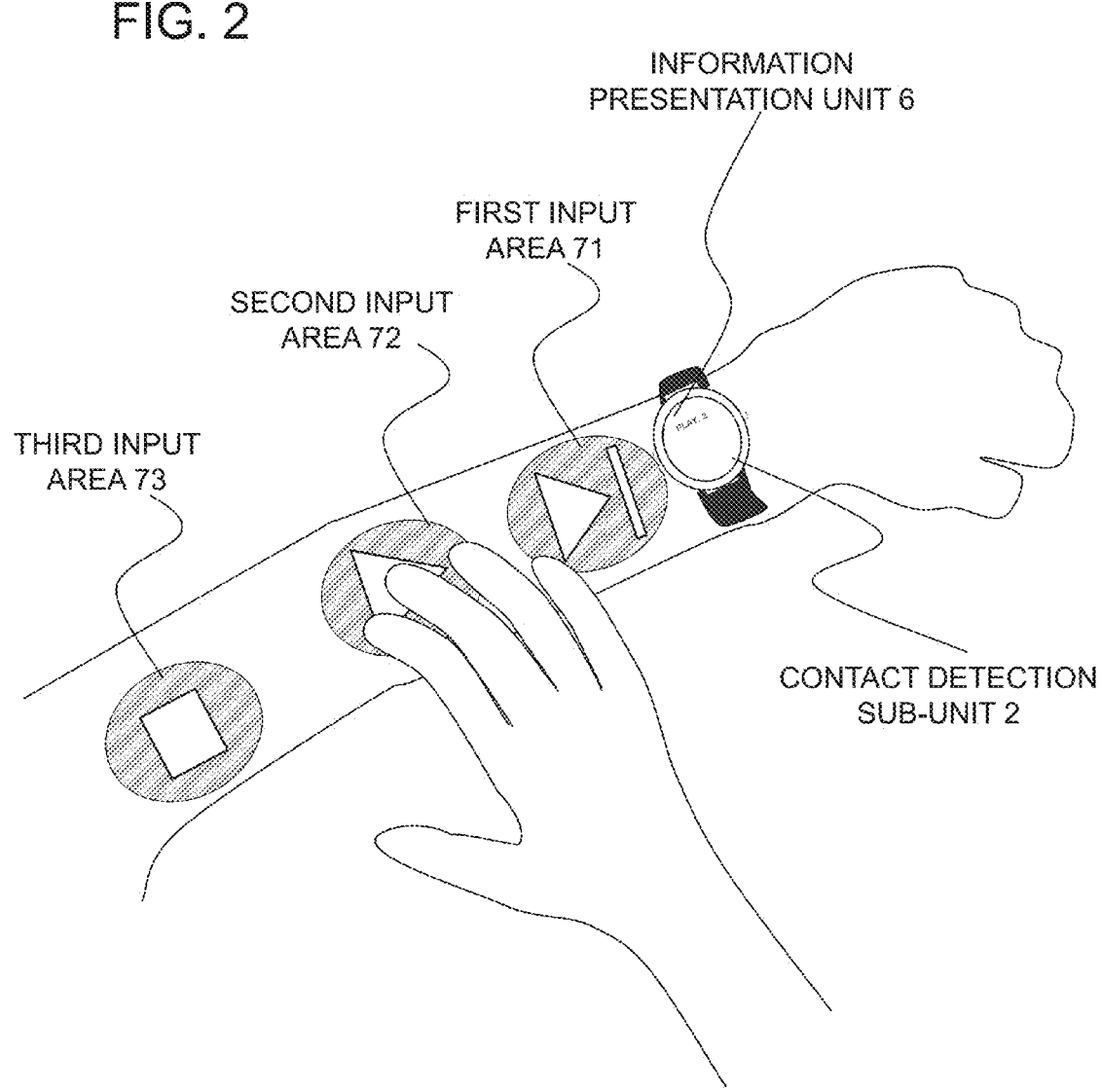
FIG. 2 is a perspective view showing input areas for the input device of the first exemplary embodiment in detail.

FIG. 2 shows details of an input area for a case where an equipment to be actuated is a mobile music player and a user's arm is to operate as an input part. Referring to FIG. 2, three such input areas 71 to 73 are arranged on the user's arm for use for actuating the equipment of interest. In the present exemplary embodiment, music playing is the operation of interest, only as an example. The functions of 'skip forward', 'play/pause' and 'stop' are allocated to the input areas 71 to 73 provided on the forearm towards wrist, on the forearm towards upper arm and on the upper arm, respectively.

The user performs an input operation as he/she taps the input areas 71 to 73 on his/her one arm with a hand of his/her other arm. When the user is running or walking as he/she listens to music, for example, he/she does not have to perform an onerous operation of taking out a mobile music player to act on its small-sized input key. Instead, he/she only has to tap his/her arm to have the equipment perform an operation associated with the tap site.

FIG. 1 depicts a block diagram showing the configuration of an input device according to the present exemplary embodiment.

Referring to FIG. 1, the input device comprises a detection unit 1, a storage unit 4, an input information identification unit 5 and an information presentation unit 6.

The detection unit 1 comprises a contact detection sub-unit 2. The contact detection sub-unit 2 is provided on the tapped side. On detection of oscillations, produced by the tap operation and transmitted through the user's body, the contact detection sub-unit outputs detection data a.

The storage unit 4 stores, from the outset, the relationship of correspondence between a period(s) of the oscillation(s) detected by the contact detection sub-unit 2, and the tap site(s), as data for decision c.

On receipt of the detection data a, the input information identification unit 5 calculates the period of oscillation(s), and refers to the data for decision c of the storage unit 4, in order to identify the tap site. The input information identification unit 5 then outputs the command, allocated to the tap site, as input information identification data d.

On receipt of the input information identification data d, the information presentation unit 6 plays or stops the music, for example, in keeping with the command, while outputting ancillary picture image demonstration.

Referring to FIG. 2, the contact detection sub-unit 2 for detecting the oscillation(s) is arranged on e.g., a wrist of a user's left hand which is the tapped side.

Figure 3:
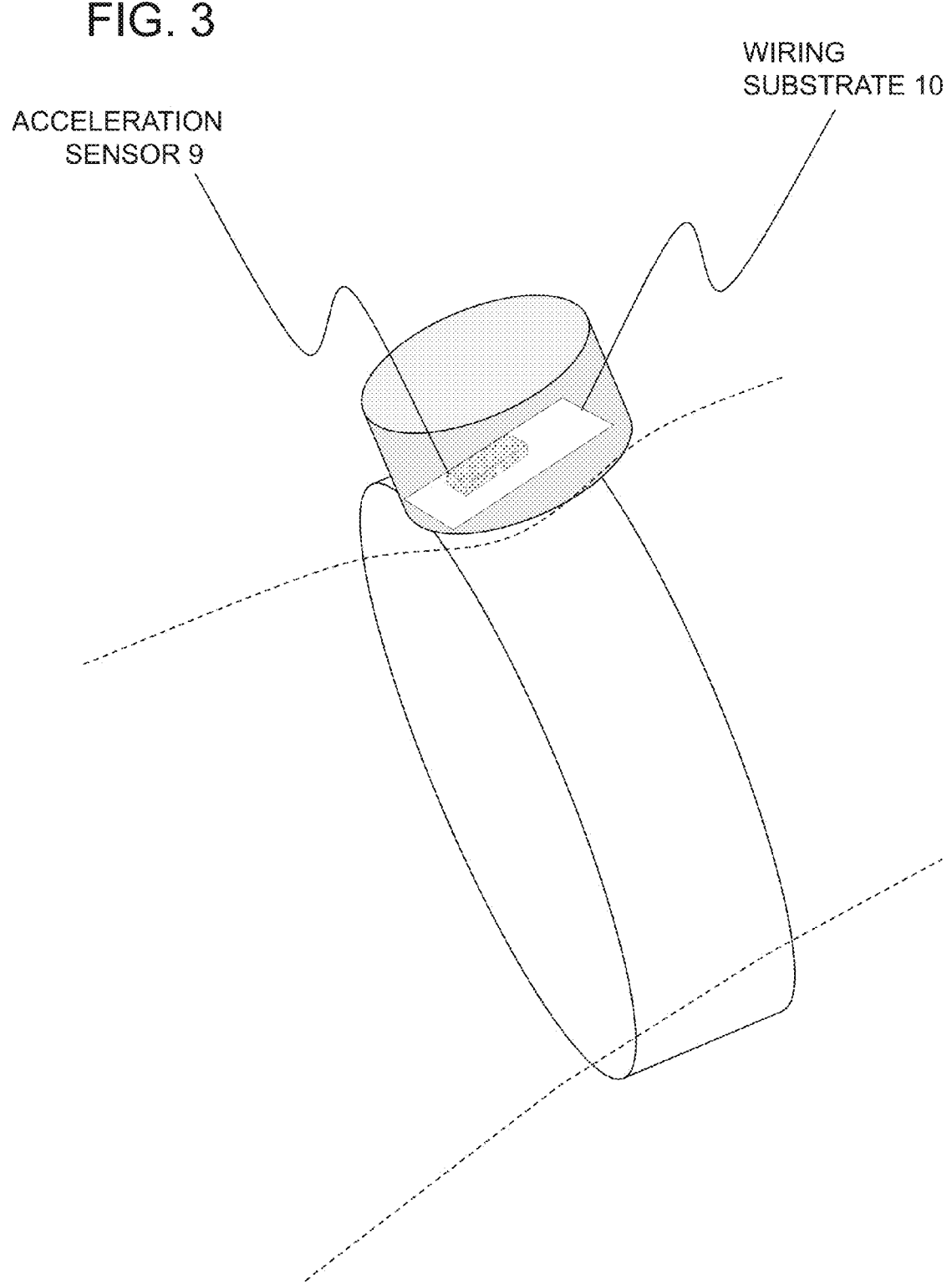
FIG. 3 is a perspective view showing a detection unit in the input device of the first exemplary embodiment in detail.

FIG. 3 shows a configuration of the detection unit 1 in detail. Referring to FIG. 3, the contact detection sub-unit 2, included in the detection unit 1, comprises an acceleration sensor 9 which is mounted on a wiring substrate 10. By this acceleration sensor 9, the contact detection sub-unit 2 detects the oscillations as acceleration.

Figure 4:
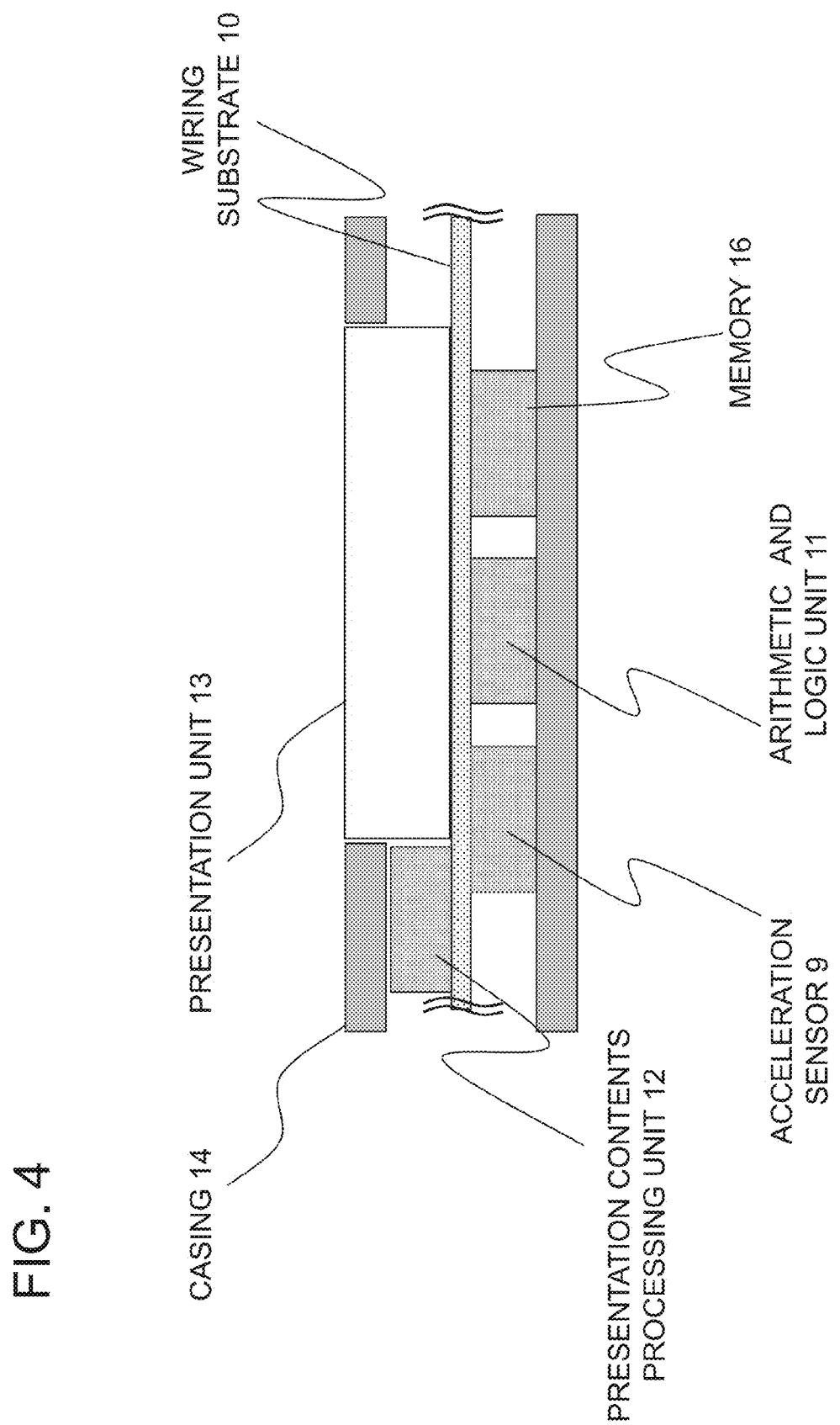
FIG. 4 is a cross-sectional view showing the detection unit in the input device of the first exemplary embodiment in detail.

FIG. 4 shows a structure of the detection unit 1 in detail. Referring to FIG. 4, the wiring substrate 10 comprises, in addition to the acceleration sensor 9, a memory 16, an arithmetic and logic unit 11, a presentation contents processing unit 12 and a presentation unit 13. These units are packaged by a casing 14.

The memory 16 retains the data for decision c of the storage unit 4. The arithmetic and logic unit 11 performs processing in the input information identification unit 5. The presentation contents processing unit 12 controls the playing/stop of a music output by a command allocated to the tap site as well as a texture in a picture in the information presentation unit 6. The presentation unit 13 outputs an audio signal controlled by the presentation contents processing unit 12 via a loudspeaker to transmit data to other presentation equipment such as Bluetooth or to output controlled pixel signals as display.

Figure 5:
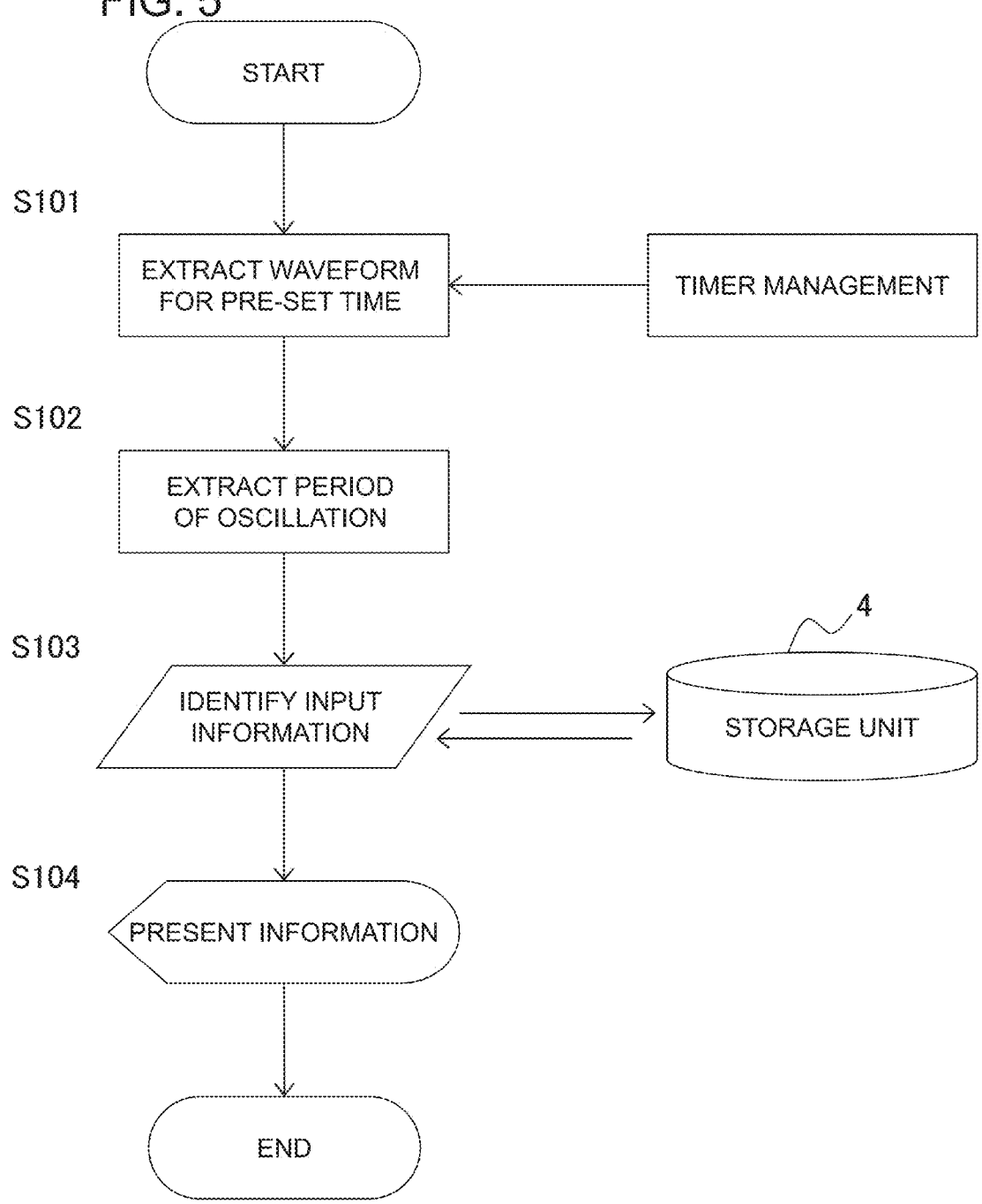
FIG. 5 is a flowchart showing the operation of the input device of the first exemplary embodiment.

The global operation of the input device according to the present exemplary embodiment will now be described with reference to the drawings. FIG. 5 depicts a flowchart for illustrating the operation of the input device of the present exemplary embodiment.

When one of the input areas 71 to 73 on the user's arm is tapped with a hand of the user's other arm, the contact detection sub-unit 2 extracts data for a pre-set time interval from the detection data a (step S101). The detection data a, representing a waveform of oscillations, is data in a time domain of values detected by the acceleration sensor 9 every sampling interval. For example, the contact detection sub-unit 2 extracts the oscillation waveform, sliced from the detection data a for a pre-set time duration as from a time of detection of an input event, as data to identify the tap site.

The oscillation by the input tap operation has its period varied depending on the value of viscoelasticity which is a physical property determined by a body tissue such as skin, flesh or bone at the tapped site. Hence, the input information identification unit 5 extracts a period of the oscillation(s), as detected by the contact detection sub-unit 2, based on the detection data a (step S102).

The input information identification unit 5 then refers to the data for decision c of the storage unit 4 which holds a relationship of correspondence between values of the periods and particular tapped sites. Note that the period has its value varied with the values of the physical properties of the body tissue at the tapped sites. The input information identification unit 5 then collates the periods of the oscillations detected against the input areas 71 to 73 to identify the particular input area tapped to output a so identified input area as an input information identification data d (step S103).

Finally, the information presentation unit 6 presents pre-set symbols, data and the functions allocated to the input area (step S104) identified.

The operation at each step will now be explained in detail.

Figure 6:
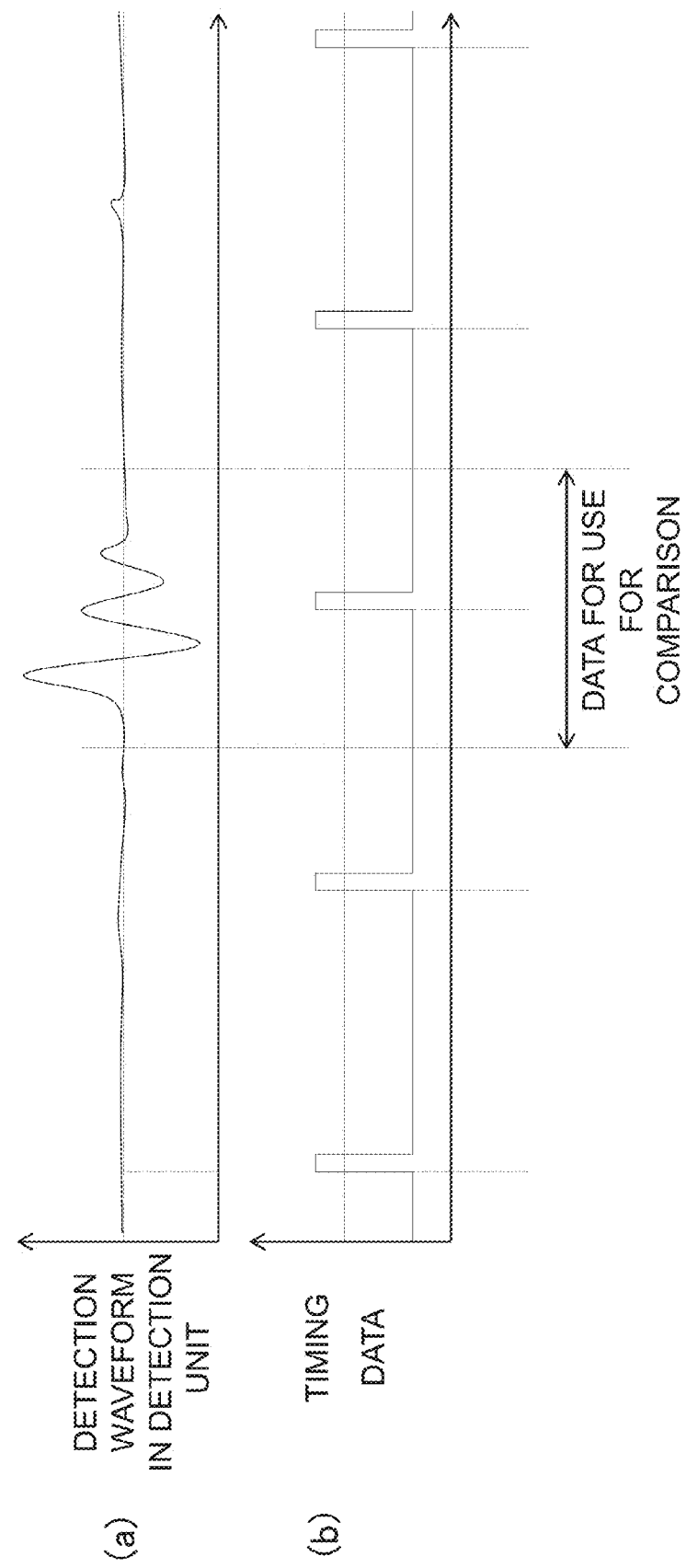
FIG. 6 is a graph for illustrating extraction of the oscillation waveform in the input device of the first exemplary embodiment.

FIG. 6 is a graph for illustrating extraction of an oscillation waveform in step S101. When the oscillation waveform, which is time domain data of values detected by the contact detection sub-unit 2, is received as the detection data a, those data among the detection data a, which fall within a pre-set time about a time point of occurrence of the input event, as reference, are extracted as data usable for comparison. The oscillation detected is an oscillation waveform at the contact detection sub-unit 2 shown at (a) of FIG. 6. Note that, if the values of the detection data at each time point are processed sequentially, communication would be time-consuming. It is thus desirable for the input information identification unit 5 to collectively receive the detection data at intervals of pre-set time duration(s).

Figure 7:
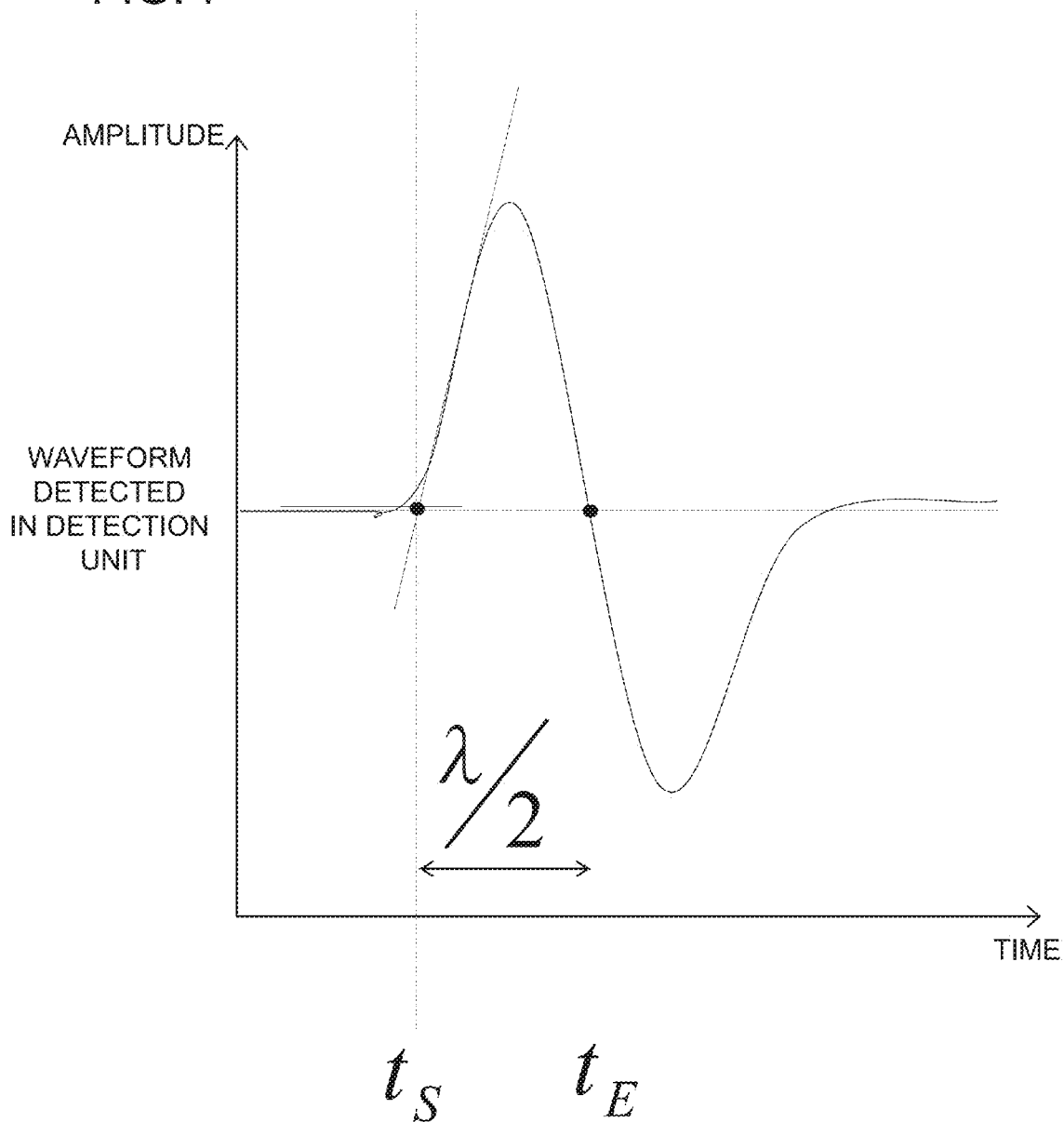
FIG. 7 is a graph for illustrating extraction of a period of the oscillations by the input device of the first exemplary embodiment.

FIG. 7 illustrates extraction of the period of oscillation in step S102. To calculate the time point of start of the oscillation produced by the tap operation, the contact detection sub-unit 2 extracts a rise time of the oscillation waveform. A time point of intersection of a steady-state value of the waveform before the start of the oscillations and a tangent to the waveform at the point of maximum tilt during the rise of the waveform is found as a time point is at which the oscillation commenced. Then, to calculate the time point corresponding to a half-period $\lambda/2$ of the oscillation, a time point when the waveform, monotonously decreasing after passing through the maximum point, intersects a steady-state part of the waveform, is found as time tE. In this case, the period $\lambda$ of the oscillations may be calculated as 2(tE−tS).

The method that uses the period of the oscillation to correlate the values of the physical properties of the body tissues at a tapped site with the tapped site will now be explained.

Figure 8:
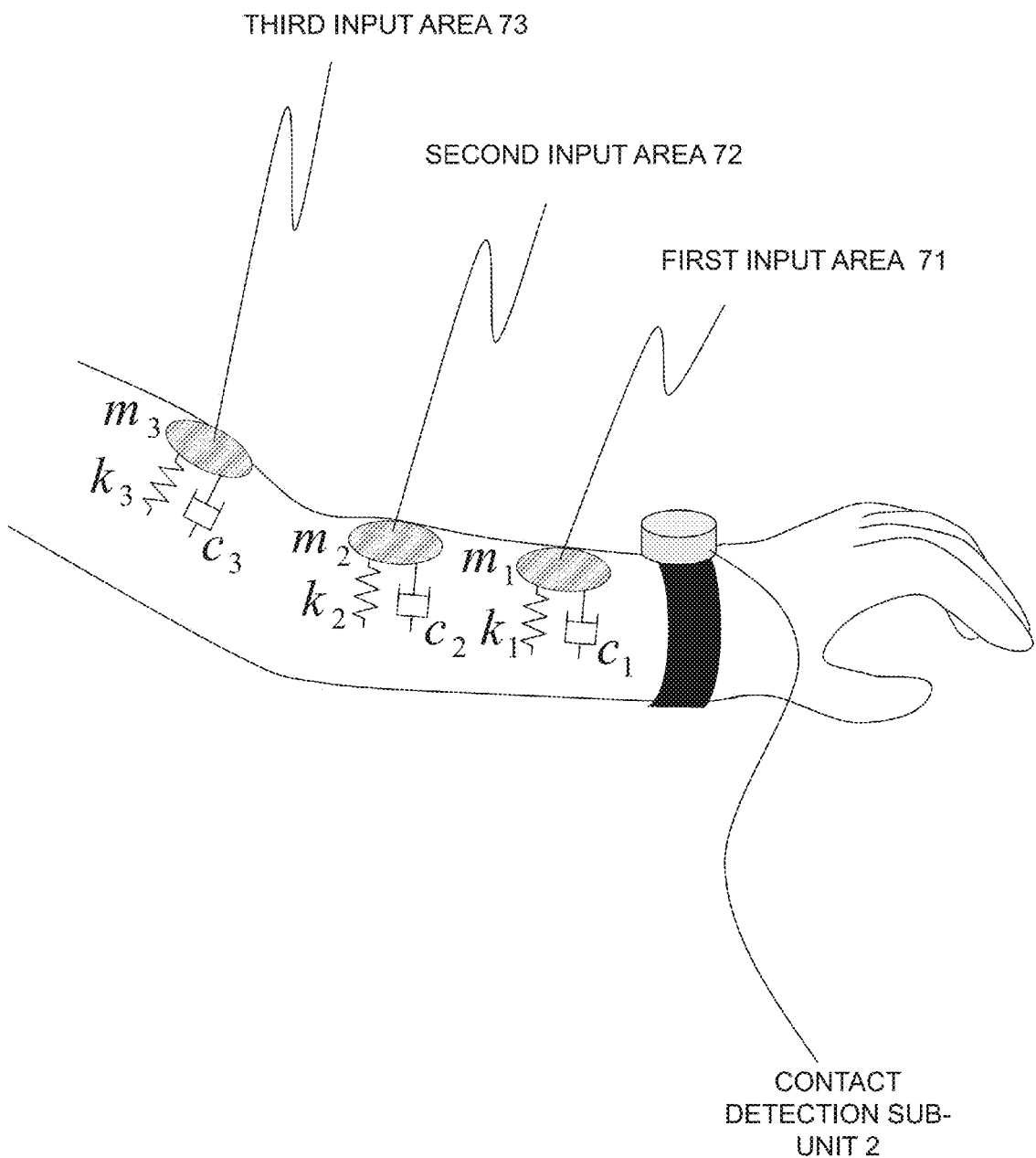
FIG. 8 is a perspective view for illustrating a model of values of physical properties of the body tissue of each input area in the input device of the first exemplary embodiment.

FIG. 8 schematically shows a model of physical values of the body tissues of the respective input areas. On the user's contacted arm, there are provided first, second and third input areas 71 to 73 which are provided in association with the forearm towards wrist, forearm towards upper arm and the upper arm of the user, respectively. Note that the input areas 71 to 73 are so denoted for convenience for explanation. It does not mean that concrete devices for detecting the sites are provided on the user's arm.

Since the human body is composed of body tissues, that is, skin, flesh, bone and blood vessels, the respective tap sites exhibit different physical properties. The body tissue may thus be expressed by a mass element, a spring element and a damper element.

It is here assumed that the body tissue of the first input area 71 is made up of a mass element with a mass weight of m1, a spring element with a coefficient of elasticity of k1 and a damper element with a coefficient of viscosity of c1. It is similarly assumed that the body tissue of the second input area 72 is made up of a mass element with a mass weight of m2, a spring element with a coefficient of elasticity of k2 and a damper element with a coefficient of viscosity of c2, and that the body tissue of the third input area 73 is made up of a mass element with a mass weight of m3, a spring element with a coefficient of elasticity of k3 and a damper element with a coefficient of viscosity of c3.

The body tissue of each of the input areas 71 to 73 is now regarded, for simplicity, as being made up of a parallel connection of a mass element, a spring element and a damper element (Voigt model). The relationship between the values of physical properties and the period(s) of oscillation(s) $\lambda$ of the body tissue may then be found as follows:

That is, if, with a tap input as an impulse input, the period of proper oscillations of attenuation at the tapped site is calculated, the period $\lambda$ may be associated with the values of the physical properties of the body tissue as indicated by the following equation [Equation 1]:

$$\lambda = \frac{2\pi}{\sqrt{\frac{k}{m} - \frac{c^2}{4m^2}}} \quad [\text{Equation 1}]$$

Since the body tissues of the input areas 71 to 73 have different values of the physical properties, it is possible to associate the period of oscillation $\lambda$ with one of the input areas 71 to 73.

The Equation 1 indicates that the period $\lambda$ becomes shorter the larger the coefficient of elasticity k, that is, the harder the body tissue.

Strictly, the coefficient of elasticity k and the coefficient of viscosity c become non-linear depending on the shape of the arm as well as that of the hand that taps and on the manner of contact or touch. The impulse of the tap input also is strictly not an impulse input. Thus, in consideration that the contact time will become longer for the lower value of the coefficient of elasticity k, the period $\lambda$ may be calculated based on a modeled representation of the relationship between the period and respective coefficients as the physical properties of the body tissues.

At any rate, the period $\lambda$ tends to be longer in the sequence of that on the forearm towards wrist (first input area 71), that on the upper arm (third input area 73) and that on the forearm towards upper arm (second input area 72). This tendency is consistent with the tendency for the period $\lambda$ to become shorter for the body tissue which is harder and which has a larger value of the coefficient of elasticity k.

Figure 9:
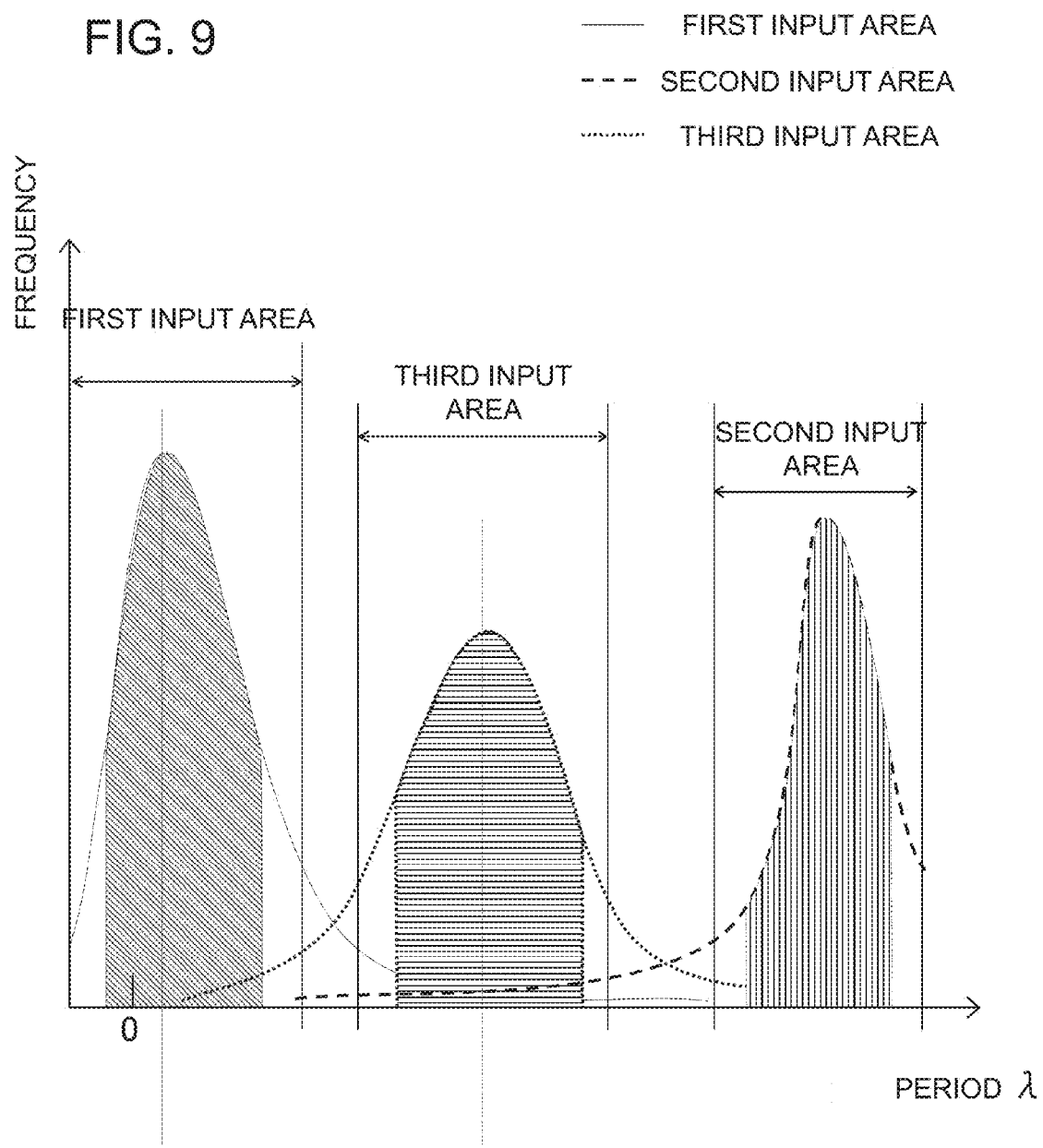
FIG. 9 is a graph for illustrating the period $\lambda$ of each input area in the input device of the first exemplary embodiment and the frequency distribution thereof.

FIG. 9 depicts a graph showing the period of oscillation $\lambda$ and its frequency distribution for each of the first to third areas 71 to 73. The values of the body tissues vary from user to user due to personal differences. Even for the same person, the particular tap sites on the input areas 71 to 73 may vary from time to time. There may also be variations ascribable to differences in the contact states between the body and the device from time to time. Thus, in step S103, the period $\lambda$ may be measured from a plural number of times of trial tap operations and lower and upper limit threshold values may then be provided in connection with variations for the input areas 71 to 73. The values intermediate between the lower and upper limit threshold values may then be determined to be inputs to the respectively input areas.

In setting the lower and upper limit threshold values, the fact that variations in the tap sites entered as inputs become normal distribution in each of the input areas 71 to 73 is taken into consideration. Thus, the lower and upper limit threshold values are set, using standard deviation $\sigma$ as a reference value, taking care so that the values of the periods to be used in determining the input areas are not overlapped with those used in determining the neighbored input area(s). For example, $\mu-2\sigma$ and $\mu+2\sigma$, where $\mu$ is an expected value of the period, may be set as the lower and upper limit threshold values, respectively. Note that 95.45% of the total of data is included at this time within a range of $\mu\pm2\sigma$.

Preferably, the threshold values, used for identifying the input information by the period of oscillation $\lambda$ at the contact detection sub-unit 2, are pre-stored in the storage unit 4 as the data for decision c.

FIG. 10 shows, in a tabulated form, an example relationship of correspondence between the input information identification data d and the lower and upper threshold values contained in the data for decision c stored in the storage unit 4. To have only the lower and upper threshold values stored as the data for decision c in the storage unit 4, a plurality of period values are obtained by tapping each of the input areas 71 to 73 a number of times at the time of preparing the data for the storage unit 4. For each of the input areas 71 to 73, an expected value of the periods, exhibiting the normal distribution, minus a standard deviation, is taken to be a lower threshold value, and the expected value of the periods plus the standard deviation is taken to be an upper threshold value. The three sets of the lower and upper threshold values are correlated with the input areas 71 to 73 for use as the data for decision c.

If the period $\lambda$ of the oscillation, as detected by the contact detection sub-unit 2, is 0.035 s, for example, this period falls intermediate between the lower and upper threshold values for the input area 71. Hence, the command allocated to the first input area 71, that is, 'skip forward', is selected.

Next, the operation of the information presentation unit 6 (step S104) will be explained in detail.

On receipt of the input information identification data d, identified by the input information identification unit 5, the information presentation unit 6 presents a function, allocated to the input site, to the user. Since the present exemplary embodiment presupposes that the music on air are to be handled, music data are controlled in accordance with the functions allocated to the input areas 71 to 73, that is, 'skip forward', 'play/pause' or 'stop', to output corresponding music or voice from a loudspeaker.

It is also possible for the information presentation unit 6 to transmit data to an earphone or a headphone via e.g., Bluetooth, in accordance with the functions allocated to the input areas 71 to 73, or to display the title of the music being played (on air) and/or the function being executed.

In the present exemplary embodiment, a one-half period as from the rise time of the vibration waveform until the oscillations restore to the original position is measured to calculate the period λ. It is however also possible to calculate the period λ based on a measured value of a one-quarter period as from the rise time of the vibration waveform until a time of a maximum value of the amplitude.

Instead of having the threshold values included in the data for decision c, the input information identification unit 5 may hold and refer to the threshold values in identifying the input information.

In the present exemplary embodiment, three input areas 71 to 73 are provided on the user's arm and a command is allocated to each of the input areas. However, the number of the input areas as well as the commands to be allocated thereto may arbitrarily be set as needed and hence the mode of the present exemplary embodiment is not to be interpreted restrictively.

In addition, in the present exemplary embodiment, three input areas 71 to 73 are all provided on the user's arm. However, the input areas may be provided on sites other than the arm provided that the body tissues at the tap sites exhibit different values of physical properties.

Moreover, in the present exemplary embodiment, the detection unit is provided on the user's wrist. The detection unit may, however, be provided on the user's upper arm, glove, finger ring or ankle as well provided that the mounting sites selected permit transmission of the oscillations. The detection unit may also be arranged on hand-held equipment carried by the user.

Second Exemplary Embodiment

An input device according to a second exemplary embodiment will now be described with respect to the drawings.

In the first exemplary embodiment, the differences in the values of the physical properties of the body tissue at the tapped sites are calculated as the periods of the oscillations detected. The periods and the tap sites are correlated with each other to identify the input areas. In the present exemplary embodiment, the time until the oscillation detected is attenuated to less than a pre-set amplitude range, referred to below as settling time, is calculated to identify the input areas.

Figure 11:
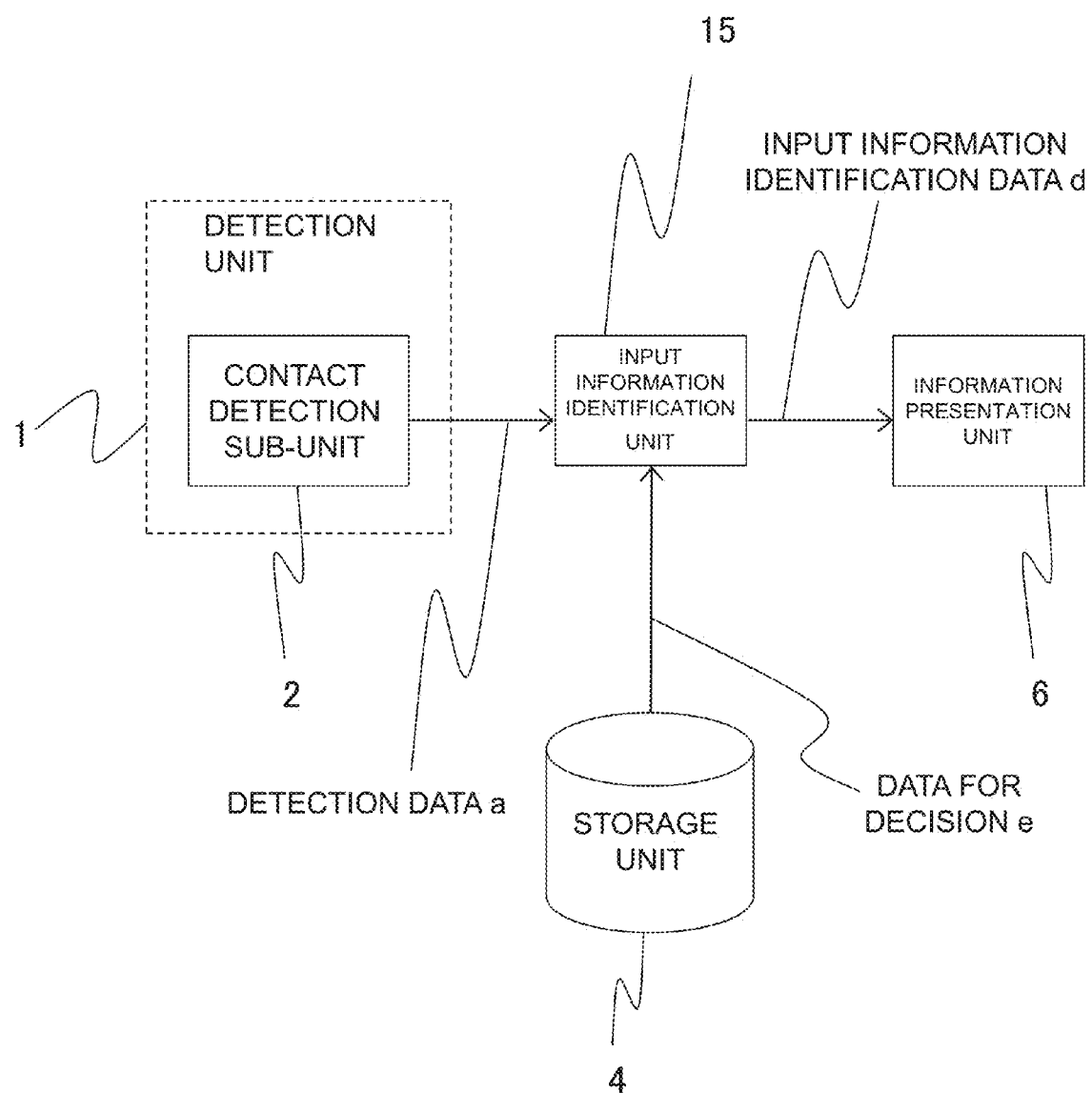
FIG. 11 is a block diagram showing a configuration of an input device of a second exemplary embodiment.

FIG. 11 depicts a block diagram showing the configuration of an input device of the present exemplary embodiment. In the first exemplary embodiment, the relationship of correspondence between the periods of oscillations as detected by the contact detection sub-unit 2 and the tap sites is pre-stored as the data for decision c in the storage unit 4. In the present exemplary embodiment, the relationship of correspondence between the settling time of the oscillations as detected by the contact detection sub-unit 2 and the tap sites is pre-stored as data for decision e in the storage unit 4.

The input device of the present exemplary embodiment comprises an input information identification unit 15 in place of the input information identification unit 5 in the first exemplary embodiment. On receipt of detection data a, the input information identification unit 15 refers to the data for decision e, pre-stored in the storage unit 4, and extracts the settling time of the oscillation as detected by the contact detection sub-unit 2 to identify the tap site.

An operation of the input device of the present exemplary embodiment will now be described in detail.

In the first exemplary embodiment, the input information identification unit 5 identifies the tap site based on the period of the oscillations as detected by the contact detection sub-unit 2. In the present exemplary embodiment, the input information identification unit 15 identifies the tap site based on the settling time of the oscillations as detected by the contact detection sub-unit 2. This is made possible by the fact that the amount of attenuation of the oscillations is varied in response to the values of the physical properties of the body tissues at the tap sites with a result that the settling time of the oscillations as detected by the detection unit 1 is also correspondingly varied.

An operation of the input information identification unit 15 will now be described in detail.

Figure 12:
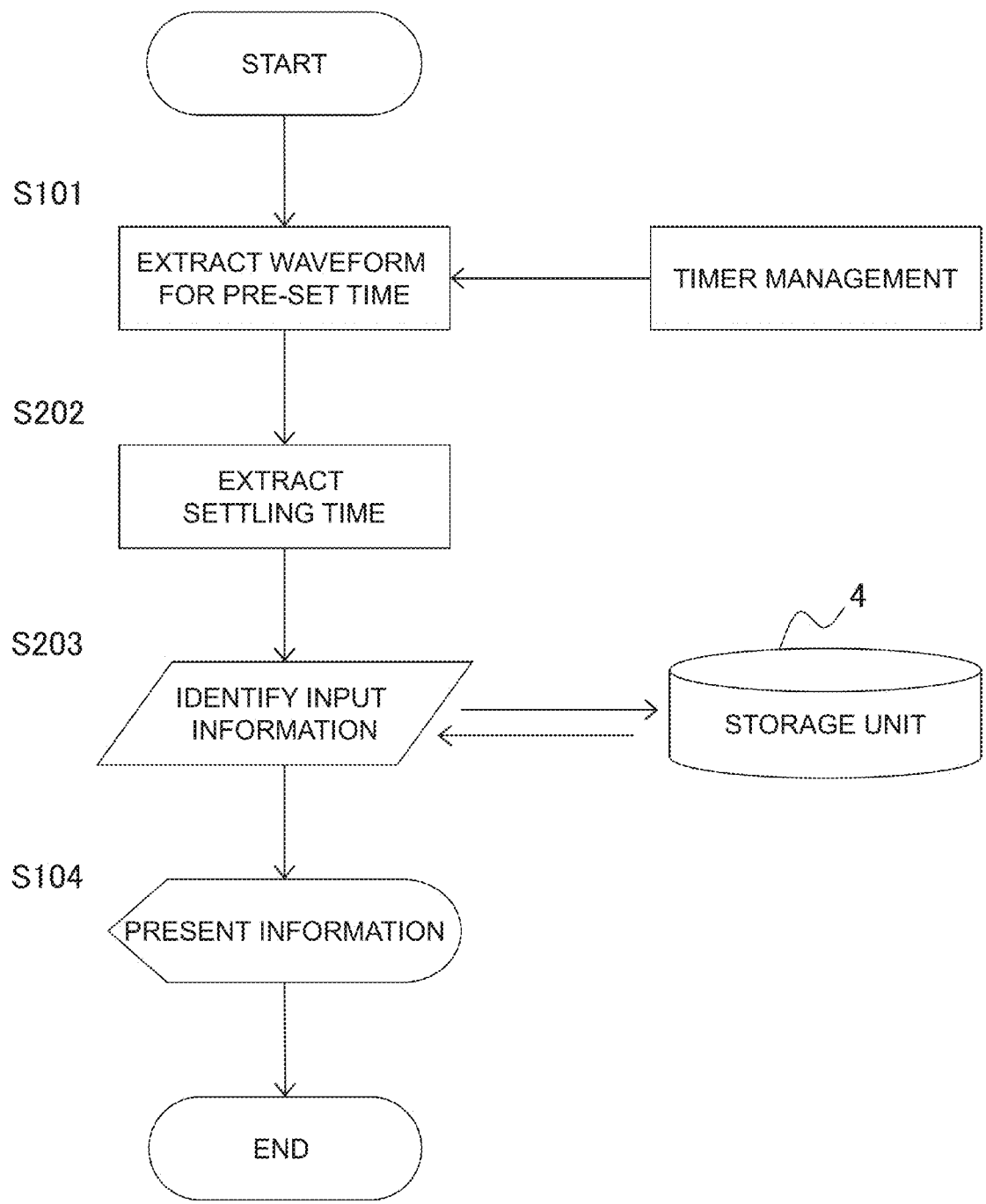
FIG. 12 is a flowchart for illustrating the operation of the input device of the second exemplary embodiment.

FIG. 12 depicts a flowchart for illustrating the operation of the input device of the present exemplary embodiment. In the first exemplary embodiment, the period of the oscillation is extracted in step S102 of FIG. 5. In the input device of the present exemplary embodiment, the settling time of the oscillation(s) as detected by the contact detection sub-unit 2 is extracted based on the detection data a (step S202).

Figure 13:
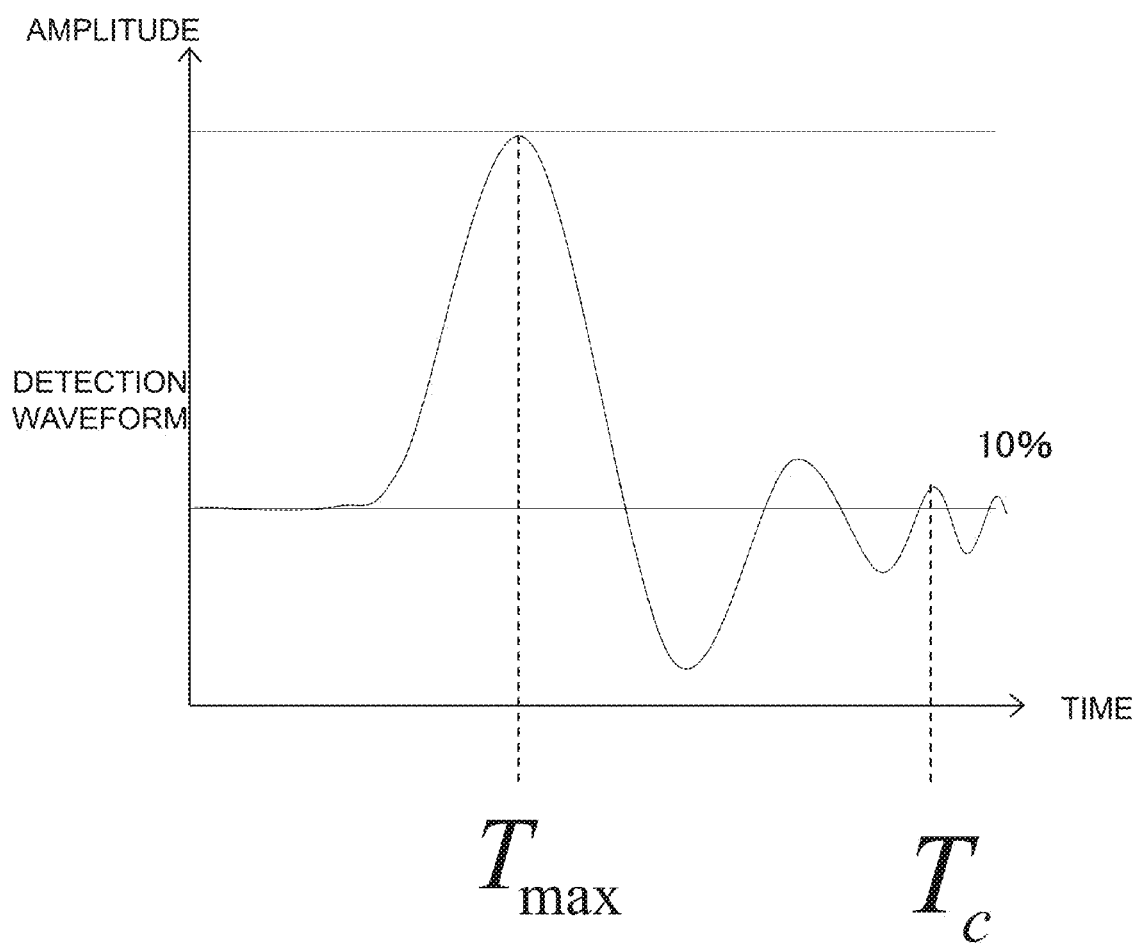
FIG. 13 is a graph for illustrating attenuation of oscillations in the contact detection sub-unit of the input device of the second exemplary embodiment.

FIG. 13 depicts the manner of attenuation of the oscillations in the contact detection sub-unit 2. In step S202, to extract the settling time for the oscillation(s) by attenuation, a time point Tmax when the amplitude becomes maximum and a time point Tc when the amplitude of the oscillation(s) has decreased to not more than 10% of the maximum value are measured. The difference between these time points is taken to be a settling time.

In the first exemplary embodiment, reference is made in step S103 of FIG. 5 to the data for decision c in the storage unit 4 that holds the relationship between the periods of oscillations as detected in the contact detection sub-unit 2 and the tap sites to identify the particular input area that has been tapped. In the present exemplary embodiment, the input information identification unit 15 refers to data for decision e in the storage unit 4 that holds the relationship between the settling time(s) as detected by the contact detection sub-unit 2 and the tap site(s). The input information identification unit correlates the settling time with the input areas to identify the particular input area 71, 72 or 73 that has been tapped (step S203).

In step S203, as in step S103, lower and upper threshold values for the settling time may be used to identify the tap site depending on whether or not the settling time falls intermediate between these threshold values.

In the present exemplary embodiment, the settling time is calculated based on the extreme end time when the amplitude has decreased to not more than 10% of the maximum amplitude. However, this method to calculate the settling time is not restrictive, such that, for example, it may also be calculated based on an extreme end time when the amplitude of the oscillations decreases to not more than 5% of the maximum amplitude.

In the present exemplary embodiment, the settling time of the oscillation(s) is calculated to take advantage of the differential attenuation of the oscillations ascribable to the differing values of the physical properties of the body tissue. It is however possible to use other methods that take advantage of the amount of attenuation of the oscillations, such as a method of calculating the attenuation ratio of the oscillations.

Third Exemplary Embodiment

An input device according to a third exemplary embodiment will now be described with reference to the drawings.

In the first and second exemplary embodiments, to decide on the operations to be performed by the equipment, three input areas 71 to 73 are provided in contact with a user's arm. The particular one of these input areas is identified by detection data which depends on the values of the physical properties of the body tissues at the tapped sites. In the present exemplary embodiment, not only the difference in the values of the physical properties of the body tissues at the tapped sites but also detection data p detected by the contact detection sub-unit 2 as later explained are resorted to. Note that different commands for operations may be allocated to inputs in the same input area depending on different arm postures on the tapped side.

Figure 14:
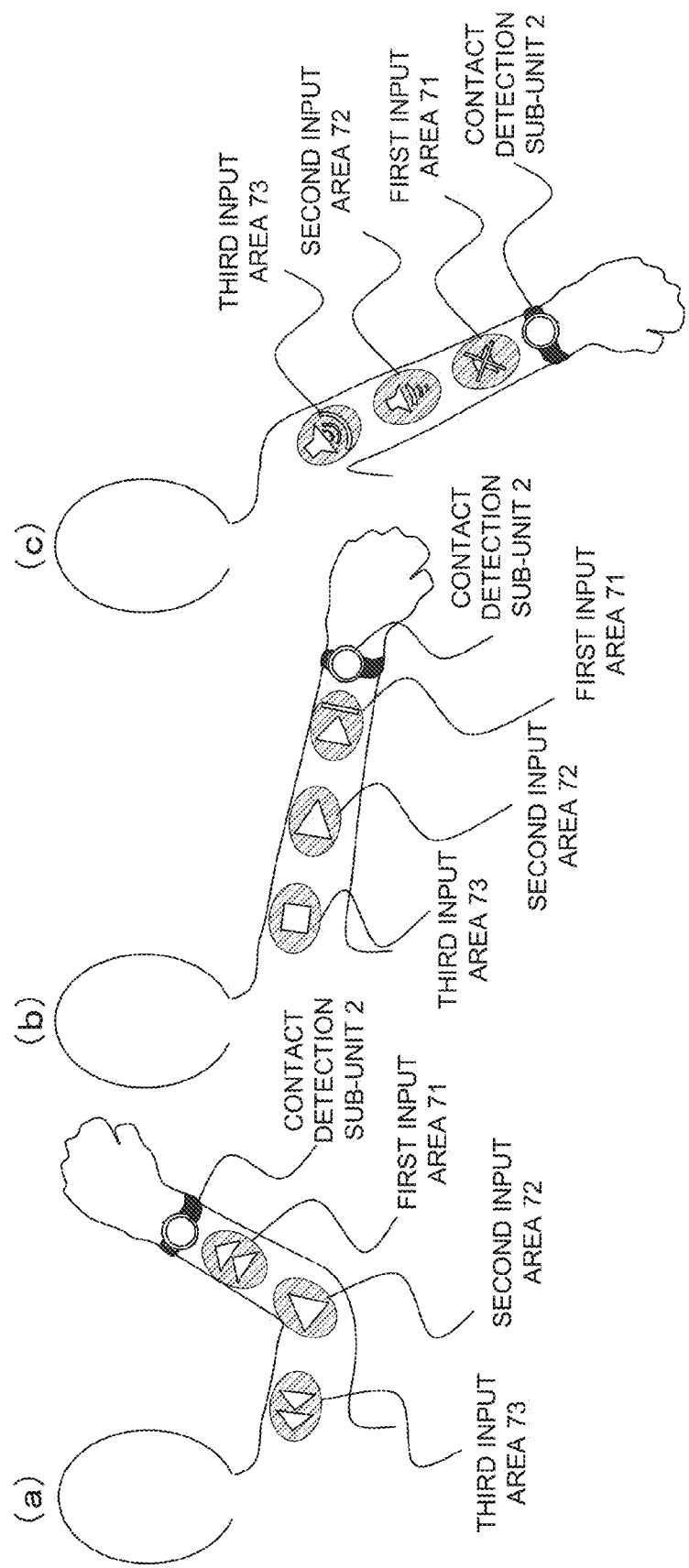
FIG. 14 is a schematic perspective view for illustrating input areas and arm postures at the input time to an input device of a third exemplary embodiment.

FIG. 14 shows different arm postures (or attitudes) at the input time point as well as respective input areas. Specifically, (a) to (c) of FIG. 14 show the user's arm in an upward posture, in a leveled posture and in a downward posture, respectively. If the arm postures are different, the commands for operations allocated to each input area are also different.

It is assumed that the equipment being operated is a music player. Referring to (b) of FIG. 14 in which the user has his/her arm in the leveled posture, a 'skip forward of selecting music' command is allocated to the input area 71 provided on the user's forearm at the his/her wrist side, as in the first exemplary embodiment. In the similar manner, a 'play/pause' command is allocated to the input area 72 provided on the user's forearm at the upper arm side, and a 'stop' command is allocated to the input area 73 provided on the user's upper arm. Referring to (a) of FIG. 14, in which the user has his/her arm in the upward posture, the 'fast forward' command, a 'play/pause' command and a 'fast rewind' command, are allocated to the input areas 71 to 73, respectively. Referring to (c) of FIG. 14, in which the user has his/her arm in the downward posture, the 'muting' command, the 'sound volume DOWN' command and the 'sound volume UP' command are allocated to the input areas 71 to 73, respectively.

Figure 15:
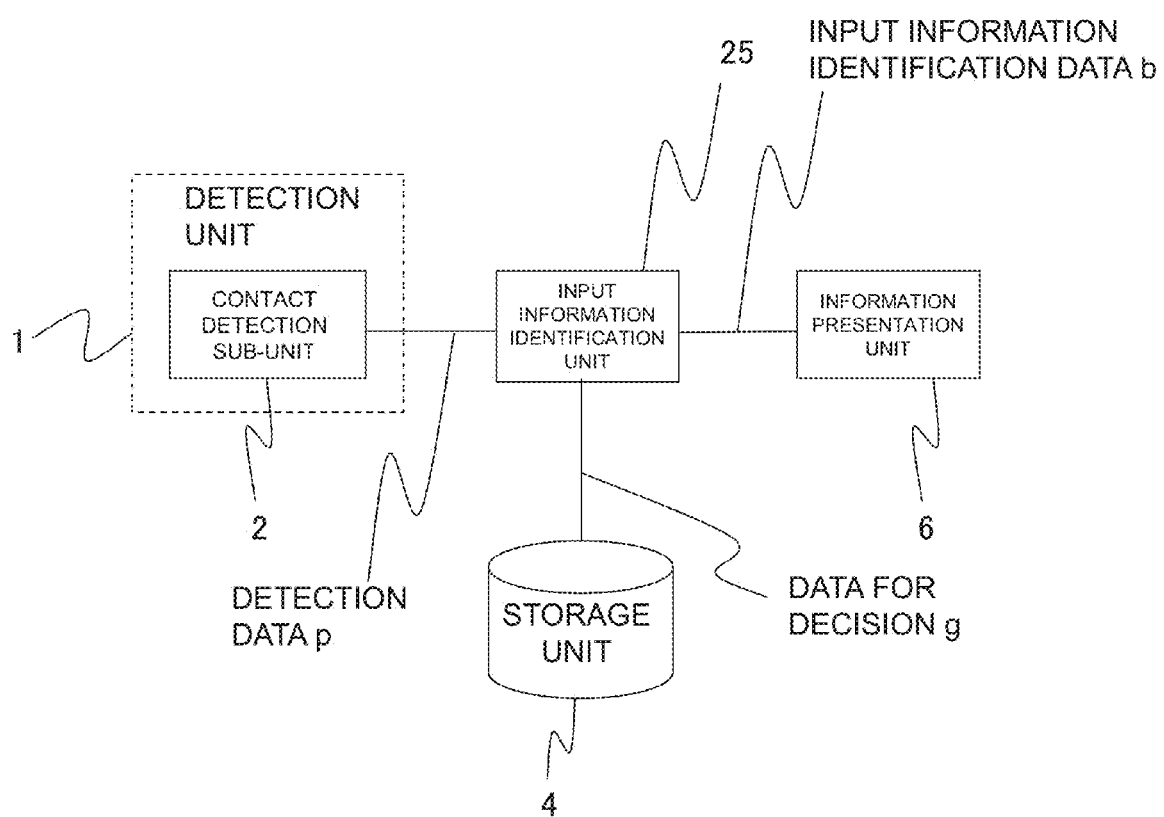
FIG. 15 is a block diagram showing a configuration of an input device of the third exemplary embodiment.

FIG. 15 depicts a block diagram showing the configuration of the input device of the present exemplary embodiment. In the first exemplary embodiment, to identify the tap sites, the relationship of correspondence between the periods of the oscillations as detected by the contact detection sub-unit 2 and the tap sites is pre-recorded as data for decision c in the storage unit 4 (FIG. 1). In the present exemplary embodiment, the arm postures as detected by the contact detection sub-unit 2 are combined with correspondence-relationship of between the periods of the oscillations as detected by the contact detection sub-unit 2 and the tap sites. Specifically, the correspondence-relationship between sets of the tap sites and the arm postures on one hand and commands for the operations on the other hand is pre-recorded as data for decision g in the storage unit 4.

Referring to FIG. 15, the input device of the present exemplary embodiment comprises an input information identification unit 25 in place of the input information identification unit 5 of the first exemplary embodiment (FIG. 5). On receipt of the detection data p, the input information identification unit 25 refers to the data for decision g in the storage unit 4 to identify the command for the operation allocated to the set of the tap site and the arm posture based on the arm postures as detected by the contact detection sub-unit 2 and on e.g., the settling time of the oscillations.

The command output in response to a command for operation identified by the tap site/arm posture set is taken to be input information identification data b.

An operation of the input device of the present exemplary embodiment will now be described.

Figure 16:
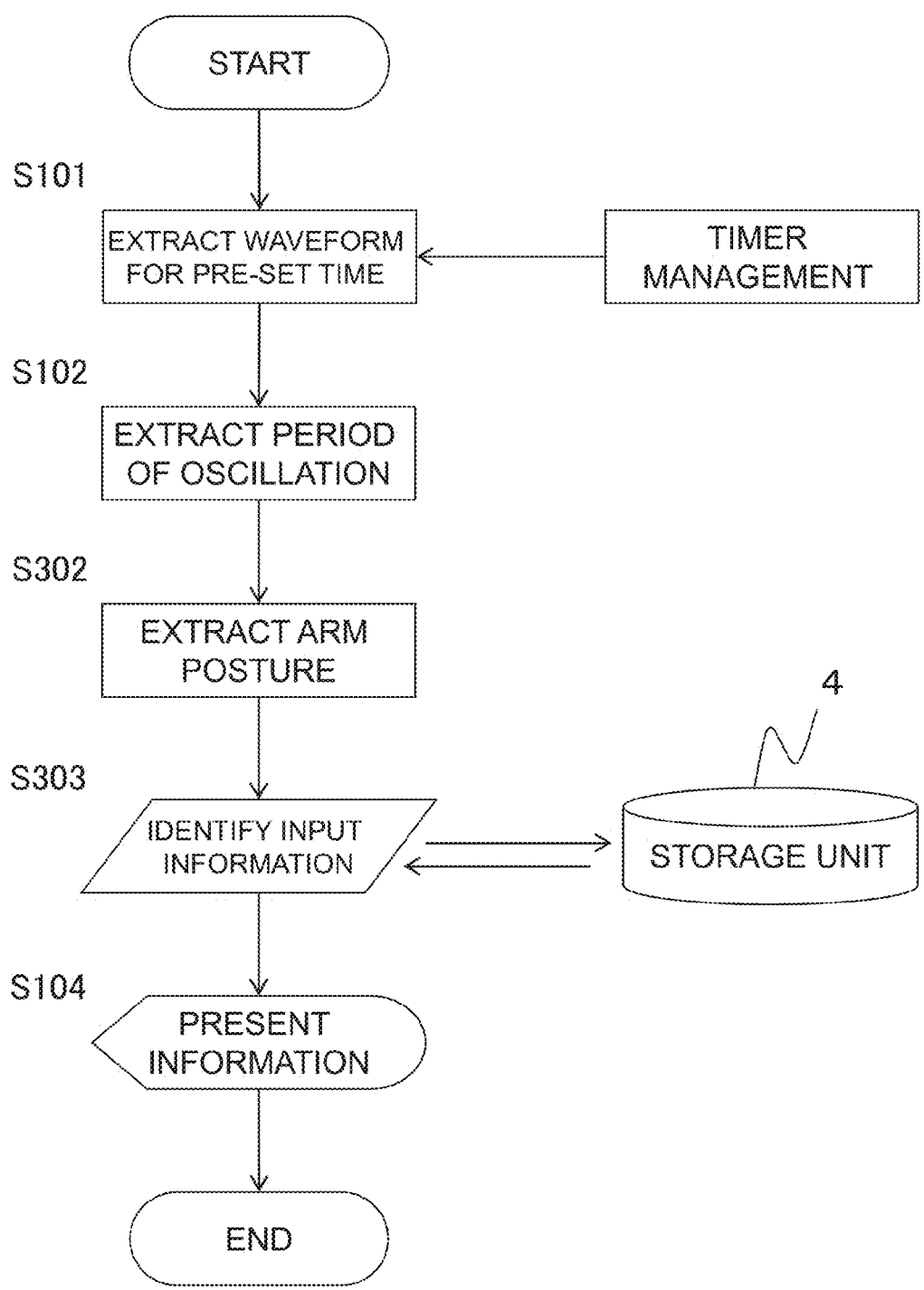
FIG. 16 is a flowchart showing an operation of the input device of the third exemplary embodiment.

FIG. 16 depicts a flowchart for illustrating the operation of the input device of the present exemplary embodiment. In the first exemplary embodiment, the period of the oscillation is extracted in step S102 of FIG. 5. In the input device of the present exemplary embodiment, the period of the oscillation is extracted in step S102, after which the arm posture at the contact detection sub-unit 2 is extracted based on the detection data p (step S302).

An operation of the input information identification unit 25 will now be described in detail.

The input information identification unit 25 refers to the data for decision g in the storage unit 4 to identify the command for operations. The data for decision g, retained in the storage unit, includes the correspondence-relationship between the tap site/arm posture sets and the commands for operations. The various tap sites may be found based on differences in the periods of oscillations of the detection data p, while the various arm postures may be found based on the values of the acceleration in the contact detection sub-unit 2. The input information identification unit 25 is able in this manner to identify the input areas 71 to 73 for the variable arm postures shown in FIG. 14 to output the commands for operations allocated as the input information identification data b.

The operation of step S302 in the input information identification unit 25 will now be described in detail.

In step S302, the input information identification unit 25 extracts the arm postures by taking advantage of the direction of the gravitational acceleration as detected by the acceleration sensor 9 of the contact detection sub-unit 2.

Figure 17:
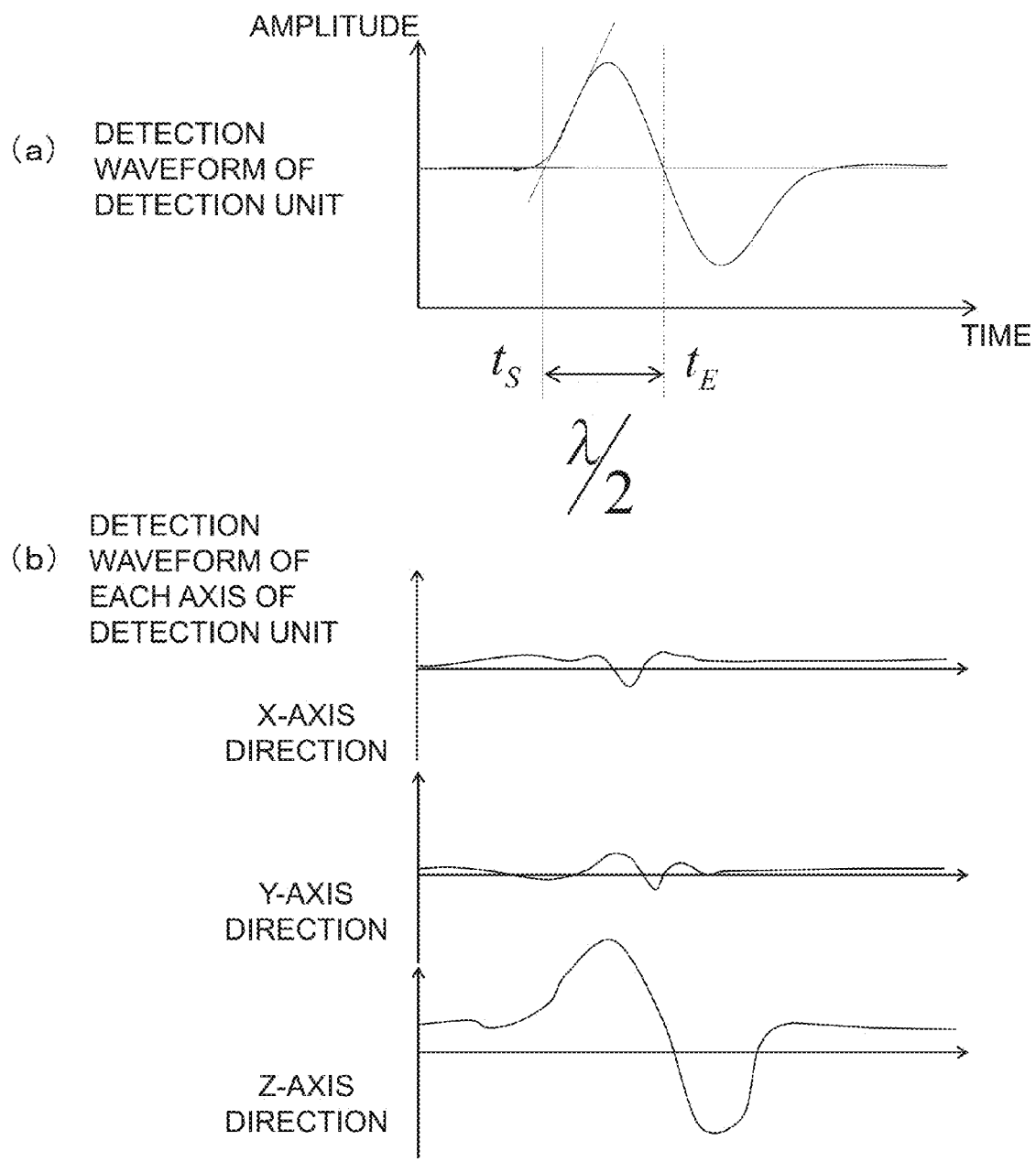
FIG. 17 is a graph for illustrating extraction of the period of oscillations and extraction of the arm postures of the input device of the third exemplary embodiment.

FIG. 17 illustrates extraction of the period of the oscillations in step S102 and extraction of the arm postures in step S302. (a) of FIG. 17 is similar to FIG. 7. The method of extracting the period of the oscillations in step S102 is similar to that described in connection with the first exemplary embodiment. (b) of FIG. 17 shows waveforms of respective components along the directions X, Y and Z of the acceleration as detected by the acceleration sensor 9 of the contact detection sub-unit 2. It is seen from (b) of FIG. 17 that certain values of the acceleration are detected before detection of the tap impact by the contact detection sub-unit 2, indicating that a pre-set gravitational acceleration is applied at all times to the acceleration sensor 9. In step S302, the input information identification unit 25 refers to the detection data p shown in (b) of FIG. 17 to calculate the acceleration under the stationary state before the time is of the beginning of the oscillation as a gravitational acceleration to be correlated with the arm postures.

The operation of the input information identification unit 25 in step S303 will now be described in detail.

FIG. 18 depicts tabulated representation showing an example of correspondence-relationship between the combinations of the upper and lower threshold values of the periods of the oscillations with the direction of the gravitational acceleration, equivalent to the arm postures, and the input information identification data b. This correspondence-relationship is included in the data for decision g stored in the storage unit 104. The lower and upper limit threshold values define the range of the period of the oscillation(s) used in extracting the tap site, and are the same as those shown in FIG. 10. Referring to FIG. 18, to represent the direction of the gravitational acceleration, equivalent to the arm postures, the values of the (X, Y, Z) components of the gravitational acceleration, ordinarily encountered for the above mentioned respective arm postures, are averaged out and stored as data for decision g.

In step S303, the input information identification unit refers to the data for decision g stored in the storage unit 4. From among the combinations of the periods of the oscillations, intermediate between the lower and upper threshold values, and the values of the gravitational acceleration, stored in the storage unit 4, the combination in which the value of the gravitational acceleration detected is closest to the stored value and the period of the oscillations is intermediate between the lower and upper threshold values is taken to be the relevant data for decision g.

In the present exemplary embodiment, the tap site is calculated from the period of oscillation(s), generated by tapping, using a method for the input device similar to that for the first exemplary embodiment. The arm posture is then calculated using the gravitational acceleration to identify the command for the operations allocated to the input area. Alternatively, to identify a tap site, a method similar to one used for the input device of the second exemplary embodiment may also be used.

In the present exemplary embodiment, the commands for operations allocated are varied based on the combinations of the tap sites and the arm postures. Alternatively, the commands for operations allocated may be varied based on the combinations of the tap sites and variations in the arm postures.

In the present exemplary embodiment, the acceleration sensor 9 is used to detect the arm postures, and the arm postures are discriminated using the gravitational acceleration to decide on the command for operation allocated to the input area. Alternatively, an angle sensor, a gyro or the like sensor may be used in combination, to decide on the arm posture.

The tap site may be calculated from the periods of the oscillations, which are variations from the stationary state, by providing the acceleration sensor 9 in the contact detection sub-unit 2 as in the present exemplary embodiment. Moreover, the arm postures may also be simultaneously calculated by taking advantage of the gravitational acceleration. Thus, with the input device of the present exemplary embodiment, it is possible to acquire a plurality of status quantities without the necessity to add a sensor(s), thus simplifying the configuration of the equipment.

The disclosures of the aforementioned Non-Patent Documents are incorporated by reference herein. Modifications and adjustments of the exemplary embodiment are possible within the ambit of the overall disclosure (including the claims) of the present invention and based on the basic technical concept of the present invention. Various combinations and selections of various disclosed elements (including each element of each claim, each element of each exemplary embodiment, each element of each drawing, etc.) are possible within the scope of the claims of the present invention. That is, the present invention of course includes various variations and modifications that could be made by those skilled in the art according to the overall disclosure including the claims and the technical concept.

It is noted that part or all of the above mentioned exemplary embodiments may be shown as modes as now stated. These modes, however, are not intended to restrict the present invention.

(Mode 1)
An input device comprising:
a detection unit that detects as detection data an oscillation generated by tapping a body of a user and transmitted via the body; and
an input information identification unit that refers to the detection data and identifies a tap site based on a fact that the detection data varies depending on a physical property of a body tissue at the tap site.

(Mode 2)
The input device according to mode 1, wherein
the detection data is a period of the oscillation.

(Mode 3)
The input device according to mode 2, further comprising a storage unit that stores a periods of the oscillation detected by the detection unit and a tap sites in association with each other, wherein
the input information identification unit refers to the storage unit to identify the tap site.

(Mode 4)
The input device according to mode 3, wherein
the storage unit stores upper and lower threshold values of a period of the oscillation and a tap site in association with each other; and
the input information identification unit identifies the tap site by deciding whether or not the detected period of the oscillation falls between the upper and lower threshold values.

(Mode 5)
The input device according to mode 1, wherein
the detection data is an attenuation characteristic of the oscillation.

(Mode 6)
The input device according to mode 5, further comprising:
a storage unit that stores an attenuation characteristic(s) of the oscillation(s) detected by the detection unit and a tap site(s) in association with each other, wherein
the input information identification unit refers to the storage unit to identify the tap site.

(Mode 7)
The input device according to mode 6, wherein
the storage unit stores upper and lower threshold values of an attenuation characteristic of the oscillation and a tap site in association with each other; and
the input information identification unit identifies the tap site by deciding whether or not the detected attenuation characteristic of the oscillations falls between the upper and lower threshold values.

(Mode 8)
The input device according to any one of modes 5 to 7, wherein
the attenuation characteristic is a settling time of the oscillation.

(Mode 9)
The input device according to any one of modes 5 to 7, wherein
the attenuation characteristic is an attenuation ratio of the oscillation.

(Mode 10)
The input device according to any one of modes 1 to 9, wherein,
the input information identification unit outputs an operation command allocated to the identified tap site.

(Mode 11)
The input device according to any one of modes 1 to 10, wherein,
the detection unit comprises an acceleration sensor that detects an oscillation.
(Mode 12)
The input device according to any one of modes 1 to 11, wherein the detection unit is provided on a wrist on the tapped side.
(Mode 13)
An input method, comprising:
by a computer, detecting as detection data an oscillation generated by tapping a body of a user and transmitted via the body; and
referring to the detection data to identify a tap site based on a fact that the detection data varies depending on a physical property of a body tissue at a site where the detection data is detected.
(Mode 14)
The input method according to mode 13, wherein
the detection data is a period of the oscillation.
(Mode 15)
The input method according to mode 14, wherein
the computer identifies the tap site by referring to a storage unit that stores a period of the oscillation, detected at a site where the detection data is detected, and the tap site in association with each other.
(Mode 16)
The input method according to mode 15, wherein
the storage unit stores upper and lower threshold values of a period of the oscillation and a tap site in association with each other; and
the computer identifies the tap site by deciding whether or not the detected period of the oscillation falls between the upper and lower threshold values.
(Mode 17)
The input method according to mode 13, wherein
the detection data is an attenuation characteristic of the oscillation.
(Mode 18)
The input method according to mode 17, wherein
the computer identifies the tap site by referring to a storage unit that stores an attenuation characteristic of the oscillation, detected at a site where the detection data id detected, and a tap site in association with each other.
(Mode 19)
The input method according to mode 18, wherein
the storage unit stores upper and lower threshold values of a period of an attenuation characteristic of the oscillation and a tap site in association with each other; and
the computer identifies the tap site by deciding whether or not the detected attenuation characteristic of the oscillation falls between the upper and lower threshold values.
(Mode 20)
The input method according to any one of modes 17 to 19, wherein the attenuation characteristic is a settling time of the oscillation.
(Mode 21)
The input method according to any one of modes 17 to 19, wherein the attenuation characteristic is an attenuation ratio of the oscillation.
(Mode 22)
The input method according to any one modes 13 to 21, further comprising:
by the computer, outputting an operation command allocated to the identified tap site.

(Mode 23)
The input method according to any one of modes 13 to 22, wherein the detection site is a wrist on the tapped side.
(Mode 24)
A program that causes a computer to execute:
detecting as detection data an oscillation generated by tapping a body of a user and transmitted via the body; and
referring to the detection data and identifying a tap site based on a fact that the detection data varies depending on a physical property of a body tissue at a site where the detection data is detected.
(Mode 25)
The program according to mode 24, wherein
the detection data is a period of the oscillation.
(Mode 26)
The program according to mode 25, wherein
the program allows a computer to execute the processing of identifying the tap site by referring to a storage unit which retains the periods of the oscillations as detected on a site of detection of the detection data and the tap sites in association with each other.
(Mode 27)
The program according to mode 26, wherein
the storage unit stores upper and lower threshold values of a period of the oscillation and a tap site in association with each other; and
the program causes the computer to execute identifying the tap site by deciding whether or not the detected period of the oscillation falls between the upper and lower threshold values.
(Mode 28)
The program according to mode 24, wherein
the detection data is an attenuation characteristic of the oscillation.
(Mode 29)
The program according to mode 28, wherein
the program causes the computer to execute identifying the tap site by referring to a storage unit that stores an attenuation characteristic(s) of the oscillation, detected at a site where the detection data is detected, and a tap site in association with each other.
(Mode 30)
The program according to mode 29, wherein
the storage unit stores upper and lower threshold values of an attenuation characteristic(s) of the oscillation(s) and a tap site in association with each other; and
the program causes the computer to execute identifying the tap site by deciding whether or not the detected attenuation characteristic of the oscillation falls between the upper and lower threshold values.
(Mode 31)
The program according to any one of modes 28 to 30, wherein the attenuation characteristic is a settling time of the oscillation.
(Mode 32)
The program according to any one of modes 28 to 30, wherein the attenuation characteristic is an attenuation ratio of the oscillation.
(Mode 33)
The program according to modes 24 to 32, wherein
the program further causes the computer to execute outputting an operation command allocated to the identified tap site.
(Mode 34)
The program according to any one of modes 24 to 33, wherein the detection site is a wrist on the tapped side.
(Mode 35)
A computer-readable recording medium storing the program according to any one of modes 24 to 34 recorded thereon.

(Mode 36)
An input device comprising:
a detection unit that detects as detection data an oscillation generated by tapping a body of a user and transmitted via the body; and
an input information identification unit that refers to the detection data, identifies a tap site based on a fact that the detection data varies depending on a physical property of a body tissue at the tap site; and
outputs an operation command allocated to the identified tap site.

(Mode 37)
An input method comprising:
by a computer, detecting as detection data an oscillation generated by tapping a body of a user and transmitted via the body;
referring to the detection data and identifying a tap site based on a fact that the detection data varies depending on a physical property of a body tissue at a site where the detection data is detected; and
outputting an operation command allocated to the identified tap site.

(Mode 38)
The input device according to any one of modes 1 to 8 or 36, wherein the detection unit includes an acceleration sensor; the input information identification unit identifies the posture of the arm tapped in response to the gravitational acceleration as detected by the acceleration sensor to output a command for operation associated with a set of the tap site and the arm posture identified.

(Mode 39)
The input device according to mode 38, wherein
the detection unit is provided on a wrist on the tapped side.

(Mode 40)
The input device according to mode 38 or 39, wherein the input information identification unit identifies, in response to the gravitational acceleration, whether the posture of the tapped arm is in an upward posture, leveled arm posture or the downward arm posture.

EXPLANATION OF REFERENCE NUMERALS 1 detection unit
2 contact detection sub-unit
4 storage unit
5, 15, 25 input information identification unit
6 information presentation unit
9 acceleration sensor
10 wiring substrate
11 arithmetic and logic unit
12 presentation contents processing unit
13 presentation unit
14 casing
16 memory
71-73 input areas
a, p detection data
c, e, g data for decision
b, d input information identification data

What is claimed is:

1. An input device comprising:
a detection unit that detects as detection data an oscillation of a body of a user generated by tapping the body of the user, the oscillation being transmitted from the tapping site to the detection unit via the body;
an input information identification unit that refers to the detection data, identifies a tap site based on a fact that the detection data varies depending on a physical property of a body tissue at the tap site, and outputs an operation command allocated to the identified tap site; and
a storage unit that stores a period of the oscillation detected by the detection unit and a tap site in association with each other, wherein
the detection data is a period of the oscillation,
the input information identification unit refers to the storage unit to identify the tap site,
the storage unit stores upper and lower threshold values of a period of the oscillation and a tap site in association with each other; and
the input information identification unit identifies the tap site by deciding whether or not the detected period of the oscillation falls between the upper and lower threshold values.

2. An input device comprising:
a detection unit that detects as detection data an oscillation of a body of a user generated by tapping the body of the user, the oscillation being transmitted from the tapping site to the detection unit via the body;
an input information identification unit that refers to the detection data, identifies a tap site based on a fact that the detection data varies depending on a physical property of a body tissue at the tap site, and outputs an operation command allocated to the identified tap site; and
a storage unit that stores an attenuation characteristic(s) of the oscillation(s) detected by the detection unit and a tap site(s) in association with each other, wherein
the input information identification unit refers to the storage unit to identify the tap site,
the detection data is an attenuation characteristic of the oscillation,
the storage unit stores upper and lower threshold values of an attenuation characteristics of the oscillation and a tap site in association with each other; and
the input information identification unit identifies the tap site by deciding whether or not the detected attenuation characteristic of the oscillation falls between the upper and lower threshold values.

3. An input device comprising:
a detection unit that detects as detection data an oscillation of a body of a user generated by tapping the body of the user, the oscillation being transmitted from the tapping site to the detection unit via the body; and
an input information identification unit that refers to the detection data, identifies a tap site based on a fact that the detection data varies depending on a physical property of a body tissue at the tap site, and outputs an operation command allocated to the identified tap site, wherein
the detection unit comprises an acceleration sensor; and
the input information identification unit identifies a posture of a tapped arm in response to a gravitational acceleration detected by the acceleration sensor to output an operation command that is associated with a set of the identified tap site and posture of the tapped arm.

4. The input device according to claim 3, wherein
the attenuation characteristic is a settling time or attenuation ratio of the oscillation.

5. The input device according to claim 3, wherein
the detection unit is provided on a wrist on the tapped side.

6. The input device according to claim 3, wherein
the input information identification unit identifies, in response to the gravitational acceleration, whether the posture of the tapped arm is in an upward posture, a leveled posture, or a downward posture.

7. An input method comprising:
by a computer, detecting as detection data an oscillation of a body of a user generated by tapping the body of the user, the oscillation being transmitted from the tapping site to a detection unit via the body;
referring to the detection data and identifying a tap site based on a fact that the detection data varies depending on a physical property of a body tissue at a site where the detection data is detected;
outputting an operation command allocated to the identified tap site;
storing a period of the oscillation detected by the detection unit and a tap site in association with each other, wherein
the detection data is a period of the oscillation,
the computer identifies the tap site by referring to the stored period of oscillation,
the computer stores upper and lower threshold values of a period of the oscillation and a tap site in association with each other; and
the computer identifies the tap site by deciding whether or not the detected period of the oscillation falls between the upper and lower threshold values.

8. A program that causes a computer to execute:
detecting as detection data an oscillation of a body of a user generated by tapping the body of the user, the oscillation being transmitted from the tapping site to a detection unit via the body;
referring to the detection data and identifying a tap site based on a fact that the detection data varies depending on a physical property of a body tissue at a site where the detection data is detected;
outputting an operation command allocated to the identified tap site;
storing a period of the oscillation detected by the detection unit and a tap site in association with each other, wherein
the detection data is a period of the oscillation,
the computer identifies the tap site by referring to the stored period of oscillation,
the computer stores upper and lower threshold values of a period of the oscillation and a tap site in association with each other; and
the computer identifies the tap site by deciding whether or not the detected period of the oscillation falls between the upper and lower threshold values.

* * * * *